United States Patent
Uchida et al.

(10) Patent No.: US 8,493,526 B2
(45) Date of Patent: Jul. 23, 2013

(54) LIGHTING DEVICE AND DISPLAY DEVICE

(75) Inventors: Tatsuo Uchida, Miyagi (JP); Takahiro Ishinabe, Miyagi (JP); Tohru Kawakami, Miyagi (JP); Tomoaki Suzuki, Miyagi (JP); Kentaro Okuyama, Miyagi (JP); Akira Ebisui, Miyagi (JP); Harumi Sato, Miyagi (JP); Mamoru Mizuno, Miyagi (JP); Masahiro Ikeda, Miyagi (JP); Shogo Shinkai, Miyagi (JP)

(73) Assignees: Sony Corporation, Tokyo (JP); Tohoku University, Miyagi (JP)

( * ) Notice: Subject to any disclaimer, the term of this patent is extended or adjusted under 35 U.S.C. 154(b) by 313 days.

(21) Appl. No.: 13/075,247

(22) Filed: Mar. 30, 2011

(65) Prior Publication Data

US 2011/0249221 A1    Oct. 13, 2011

(30) Foreign Application Priority Data

Apr. 7, 2010   (JP) ................................. 2010-089075
Dec. 28, 2010  (JP) ................................. 2010-293311
Mar. 4, 2011   (JP) ................................. 2011-048340

(51) Int. Cl.
   *G02F 1/1335*     (2006.01)
(52) U.S. Cl.
   USPC ............................................. 349/64; 349/65
(58) Field of Classification Search
   USPC ....................................... 349/64, 65
   See application file for complete search history.

(56) References Cited

U.S. PATENT DOCUMENTS

| 7,990,605 | B2 * | 8/2011 | Okuyama et al. | 359/296 |
| 8,237,888 | B2 * | 8/2012 | Okuyama et al. | 349/65 |
| 8,259,384 | B2 * | 9/2012 | Uchida et al. | 359/315 |
| 8,330,709 | B2 * | 12/2012 | Uchida et al. | 345/102 |
| 2001/0046009 | A1 * | 11/2001 | Hatano et al. | 349/86 |
| 2008/0205083 | A1 * | 8/2008 | Sumiyoshi et al. | 362/619 |
| 2010/0085510 | A1 * | 4/2010 | Okuyama et al. | 349/65 |
| 2010/0165450 | A1 * | 7/2010 | Okuyama et al. | 359/315 |
| 2010/0171903 | A1 * | 7/2010 | Okuyama | 349/65 |
| 2011/0141551 | A1 * | 6/2011 | Uchida et al. | 359/316 |
| 2011/0217629 | A1 * | 9/2011 | Okuyama et al. | 430/4 |
| 2011/0242146 | A1 * | 10/2011 | Uchida et al. | 345/690 |
| 2011/0249221 | A1 * | 10/2011 | Uchida et al. | 349/65 |
| 2012/0257139 | A1 * | 10/2012 | Shinkai et al. | 349/61 |

FOREIGN PATENT DOCUMENTS

JP    06-347790    12/1994

* cited by examiner

*Primary Examiner* — Rhonda Peace
(74) *Attorney, Agent, or Firm* — Wolf, Greenfield & Sacks, P.C.

(57) ABSTRACT

A lighting device includes: a light guide plate; a light source disposed on a side face of the light guide plate; and a light modulation element disposed on a surface or in the inside of the light guide plate and adhered to the light guide plate. The light modulation element has a pair of transparent substrates disposed separately and oppositely, a pair of electrodes provided on respective surfaces of the pair of transparent substrates, and a light modulation layer provided in a gap between the pair of transparent substrates. The light modulation layer includes a first region, having optical anisotropy, responsive to an electric field, and a second region, having optical anisotropy, unresponsive to an electric field. The second region has a striped structure with average striped texture size of 0.05 μm to 10 μm both inclusive in a short axis direction.

11 Claims, 21 Drawing Sheets

20 μm

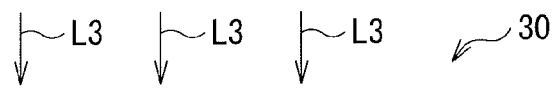

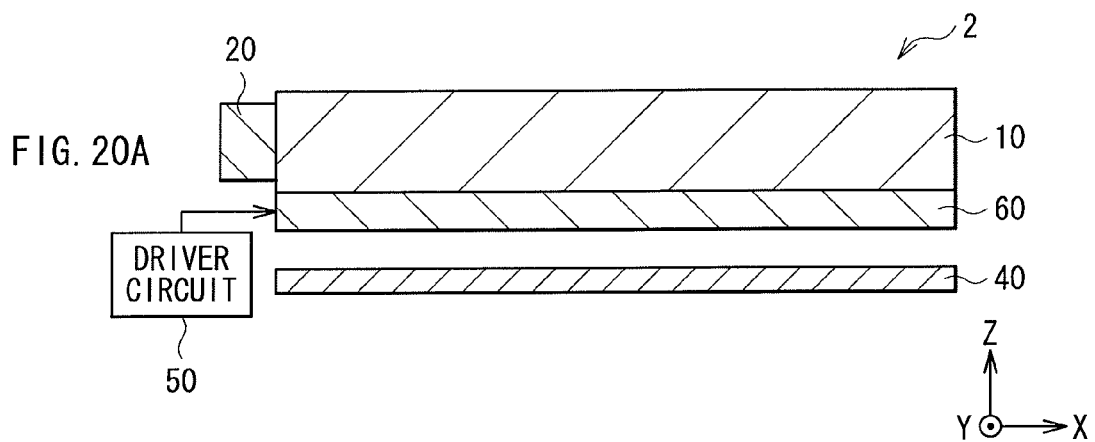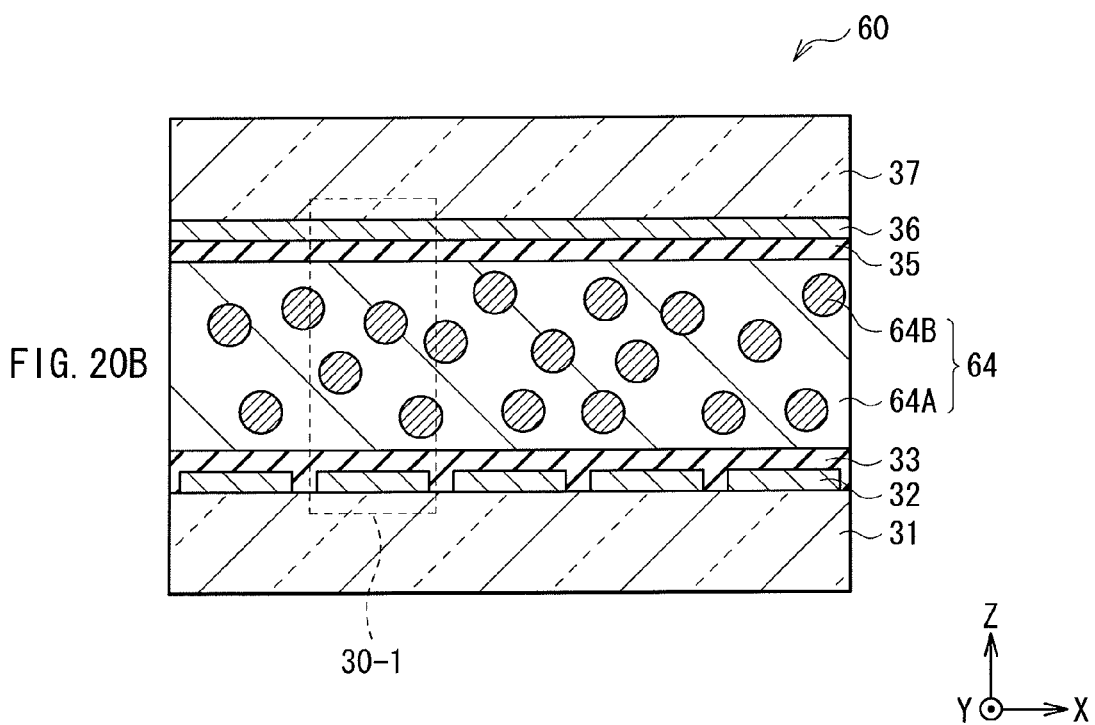

LIGHTING DEVICE AND DISPLAY DEVICE

BACKGROUND OF THE INVENTION

1. Field of the Invention

The present invention relates to a lighting device and a display device, each device having a light modulation element exhibiting a scattering property or a transparent property with respect to light.

2. Description of Related Art

Recently, a liquid crystal display has been rapidly improved in image quality or advanced in energy saving, and a method of partially modulating intensity of light from a backlight has been proposed to improve scotopic contrast. In the method, mostly, light emitting diodes (LEDs), used for a light source of a backlight, are partially driven to modulate light from a backlight in accordance with a display image. In addition, size reduction has been increasingly demanded in a large-size liquid crystal display as well as in a small-size liquid crystal display. Therefore, attention is being focused on an edge light type, where a light source is disposed on an edge of a light guide plate, rather than a type where a cold cathode fluorescent lamp (CCFL) or LEDs is/are disposed directly under a liquid crystal panel. However, it is hard to achieve partial drive, where light intensity of a light source is partially modulated, in the edge light type.

SUMMARY OF THE INVENTION

As a method to extract light propagating in a light guide plate, for example, Japanese Unexamined Patent Publication No. 6-347790 proposes a display device using a polymer dispersed liquid crystal (PDLC) switchable between transparent and scattering states. This is a technique to prevent mirroring or the like, where voltage is partially applied to PDLC for switching between transparent and scattering states. However, the backlight has a difficulty, namely, a long wavelength component of illumination light increases with increase in distance from a light source attached on an end of a light guide plate.

It is desirable to provide a lighting device and a display device, in which in-plane variation of light intensity distribution of illumination light may be reduced over the whole visible range.

A first lighting device according to an embodiment of the invention includes a light guide plate, a light source disposed on a side face of the light guide plate, and a light modulation element disposed on a surface or in the inside of the light guide plate and adhered to the light guide plate. The light modulation element has a pair of transparent substrates disposed separately and oppositely, a pair of electrodes provided on respective surfaces of the pair of transparent substrates, and a light modulation layer provided in a gap between the pair of transparent substrates. The light modulation layer includes a first region, having optical anisotropy, responsive to an electric field, and a second region, having optical anisotropy, unresponsive to an electric field. Here, the second region has a striped structure with average striped texture size of 0.05 μm to 10 μm both inclusive in a short axis direction.

A first display device according to an embodiment of the invention includes a display panel having a plurality of pixels arranged in a matrix, the pixels being driven based on an image signal, and a lighting device lighting the display panel. The lighting device in the display device has the same components as those of the first lighting device.

In the first lighting device and the first display device according to the embodiments of the invention, the light modulation layer including the first region and the second region is provided in the light modulation element adhered to the light guide plate. Each of the first region and the second region has optical anisotropy, and has the above alignment property in response to an electric field. According to this, for example, an optical axis direction of the first region and an optical axis direction of the second region may be adjusted to be equal to or different from each other by controlling an electric field. Therefore, for example, when ordinary refractive indexes of both the regions are adjusted to be similar to each other and extraordinary refractive indexes of both are also adjusted to be similar to each other, and the optical axis direction of the first region and the optical axis direction of the second region are adjusted to be equal to each other by controlling an electric field, refractive-index difference is small in all directions including front and oblique directions, leading to a high transparent-property. For example, when an optical axis direction of the first region is adjusted to intersect with (or be orthogonal to) an optical axis direction of the second region by controlling an electric field, refractive-index difference is large in all directions including front and oblique directions, leading to a high scattering property. In the first lighting device and the first display device according to the embodiments of the invention, the second region has average striped-texture size of 0.05 μm to 10 μm both inclusive in a short axis direction. According to this, when light emitted from a light source repeatedly passes through the light modulation element while propagating in the light guide plate, balance of light scattering may be kept over the whole visible range. In the case that average striped-texture size in a short axis direction is 0.05 μm to 10 μm both inclusive, scattering ability is approximately even in the light modulation element over a visible range of 380 nm to 780 nm both inclusive. Therefore, light of a particular wavelength component is prevented from being exclusively increased or decreased in a plane, and therefore light balance may be achieved in a plane over the visible range. When the average striped-texture size in a short axis direction is less than 0.05 μm or is more than 10 μm, scattering ability of the light modulation element is low regardless of wavelengths, and therefore the light modulation element does not operate.

A second lighting device according to an embodiment of the invention includes a light guide plate, a light source disposed on a side face of the light guide plate, and a light modulation element disposed on a surface or in the inside of the light guide plate and adhered to the light guide plate. The light modulation element has a pair of transparent substrates disposed separately and oppositely, a pair of electrodes provided on respective surfaces of the pair of transparent substrates, and a light modulation layer provided in a gap between the pair of transparent substrates. The light modulation layer includes a first region, having optical anisotropy, responsive to an electric field, and a second region, having optical anisotropy, unresponsive to an electric field. Here, a transparent conductive film includes indium tin oxide (ITO), and has an optical characteristic as expressed by the following formula.

$$|A1-A2| \leq 0.5$$

A1: maximum light absorptance in a wavelength of 450 nm to 650 nm (%) both inclusive A2: minimum light absorptance in a wavelength of 450 nm to 650 nm (%) both inclusive A second display device according to an embodiment of the invention includes a display panel having a plurality of pixels arranged in a matrix, the pixels being driven based on an image signal, and a lighting device lighting the display panel. The lighting device in the display device has the same components as those of the second lighting device.

In the second lighting device and the second display device according to the embodiments of the invention, the light modulation layer including the first region and the second region is provided in the light modulation element adhered to the light guide plate. Each of the first region and the second region has optical anisotropy, and has the above alignment property in response to an electric field. According to this, for example, an optical axis direction of the first region and an optical axis direction of the second region may be adjusted to be equal to or different from each other by controlling an electric field. Therefore, for example, when ordinary refractive indexes of both the regions are adjusted to be similar to each other and extraordinary refractive indexes of both are also adjusted to be similar to each other, and an optical axis direction of the first region is adjusted to be equal to an optical axis direction of the second region by controlling an electric field, refractive-index difference is small in all directions including front and oblique directions, leading to a high transparent-property. For example, when an optical axis direction of the first region is adjusted to intersect with (or be orthogonal to) an optical axis direction of the second region by controlling an electric field, refractive-index difference is large in all directions including front and oblique directions, leading to a high scattering property. In the second lighting device and the second display device according to the embodiments of the invention, one or both of the pair of electrodes includes a transparent conductive film. The transparent conductive film includes indium tin oxide (ITO), and has the optical characteristic as expressed by the above formula. The transparent conductive film is made to have the optical characteristic as expressed by the above formula in this way, thereby when light emitted from a light source repeatedly passes through the transparent conductive film in the light modulation element while propagating in the light guide plate, wavelength dependence of absorption of the transparent conductive film is suppressed.

In addition to the above method, the following is listed as a method of keeping balance of light scattering over the whole visible range in the lighting device and the display device.

For example, when one or both of the pair of electrodes in the light modulation element is formed of a film including ITO (hereinafter, called ITO film), for example, a dye or pigment absorbing a large amount of long-wavelength light compared with short-wavelength light is preferably contained in some portion of a light path for guiding light (for example, one or both of the light guide plate and the light modulation element). A known material may be used as the dye or pigment. In particular, when a light modulation layer is formed through a process including ultraviolet irradiation, for example, after a light modulation element is formed, a light guide plate containing the dye or pigment is preferably attached to the light modulation element. Alternatively, a portion containing the dye or pigment is preferably protected from ultraviolet rays by an ultraviolet absorption layer to prevent the dye or pigment from being damaged by ultraviolet rays.

The dye or pigment is added into some portion of a light path for guiding light in this way, thereby when light emitted from a light source repeatedly passes through the light modulation element while propagating in the light guide plate, wavelength dependence of absorption of the light modulation element including an ITO film is suppressed.

For example, when one or both of the pair of electrodes in the light modulation element is formed of an ITO film, an optical multilayer film whose reflectance is low in a short wavelength range compared with in a long wavelength range, is preferably provided on a surface or back of the ITO film. Such an optical multilayer film includes, for example, a film formed by alternately stacking low-refractive-index layers including silicon dioxide and high-refractive-index layers including niobium pentoxide.

The optical multilayer film is provided on a light output side of the light modulation element of the surface or the back of the ITO film in this way, thereby when light emitted from the light source is repeatedly passes through the ITO film in the light modulation element while propagating in the light guide plate, wavelength dependence of reflection of the ITO film is suppressed by an effect of the optical multilayer film.

For example, when the first region in the light modulation element mainly includes a liquid crystal material responsive to an electric filed, and the second region in the light modulation element mainly includes a polymer material unresponsive to an electric filed, difference (refractive-index difference $\Delta no = no_L - no_p$) between an ordinary refractive index $no_L$ of the first region and an ordinary refractive index $no_p$ of the second region is preferably 0.1 or less in a visible range, and difference (refractive-index difference $\Delta ne = ne_L - ne_p$) between the extraordinary refractive index $ne_L$ of the first region and the extraordinary refractive index $ne_p$ of the second region is preferably 0.1 or less in a visible range. Furthermore, the first region and the second region are preferably in a relationship as expressed by the following formulas (A) and (B), and more preferably in a relationship as expressed by the following formulas (C) and (D).

$$|\Delta ne(450 \text{ nm}) - \Delta ne(650 \text{ nm})| \leq 0.059 \quad (A)$$

$$|\Delta no(450 \text{ nm}) - \Delta no(650 \text{ nm})| \leq 0.059 \quad (B)$$

$$|\Delta ne(450 \text{ nm}) - \Delta ne(650 \text{ nm})| \leq 0.032 \quad (C)$$

$$|\Delta no(450 \text{ nm}) - \Delta no(650 \text{ nm})| \leq 0.032 \quad (D)$$

$\Delta ne$ (450 nm): $\Delta ne$ at 450 nm
$\Delta ne$ (650 nm): $\Delta ne$ at 650 nm
$\Delta no$ (450 nm): $\Delta no$ at 450 nm
$\Delta no$ (650 nm): $\Delta no$ at 650 nm Each of the first region and the second region has the above property in this way, thereby when light emitted from the light source is repeatedly passes through the first region and the second region in the light modulation element while propagating in the light guide plate, wavelength dependence of scattering in a dark state, which varies with a distance from the light source, is suppressed.

For example, when the first region in the light modulation element mainly includes a liquid crystal material, and the second region in the light modulation element mainly includes a polymer material, difference (refractive-index difference $\Delta(ne_L - no_p) = ne_L - no_p$) between an extraordinary refractive index $ne_L$ of the first region and an ordinary refractive index $no_p$ of the second region is preferably 0.1 or more in a visible range, and difference (refractive-index difference $\Delta(ne_p - no_L) = ne_p - no_L$) between the extraordinary refractive index $ne_p$ of the second region and the ordinary refractive index $no_L$ of the first region is preferably 0.1 or more in a visible range. Furthermore, the first region and the second region are preferably in a relationship as expressed by the following formulas (E) and (F), and more preferably in a relationship as expressed by the following formulas (G) and (H).

$$|\Delta(ne_L - no_p)(450 \text{ nm}) - \Delta(ne_L - no_p)(650 \text{ nm})| \leq 0.080 \quad (E)$$

$$|\Delta(ne_p - no_L)(450 \text{ nm}) - \Delta(ne_p - no_L)(650 \text{ nm})| \leq 0.080 \quad (F)$$

$|\Delta(ne_L-no_p)(450\text{ nm})-\Delta(ne_L-no_p)(650\text{ nm})|\leq 0.044$ (G)

$|\Delta(ne_p-no_L)(450\text{ nm})-\Delta(ne_p-no_L)(650\text{ nm})|\leq 0.044$ (H)

$\Delta(ne_L-no_p)$ (450 nm): $ne_L-no_p$ at 450 nm
$\Delta(ne_L-no_p)$ (650 nm): $ne_L-no_p$ at 650 nm
$\Delta(ne_p-no_L)$ (450 nm): $ne_p-no_L$ at 450 nm
$\Delta(ne_p-no_L)$ (650 nm): $ne_p-no_L$ at 650 nm Each of the first region and the second region has the property as above, thereby when light emitted from the light source is repeatedly passes through the first region and the second region in the light modulation element while propagating in the light guide plate, wavelength dependence of scattering in a light state, which varies with a distance from the light source, is suppressed.

When the first region in the light modulation element mainly includes a liquid crystal material, and the second region in the light modulation element mainly includes a polymer material, a combination of the liquid crystal material and the polymer material is appropriately selected, thereby refractive-index difference $\Delta(ne_L-no_p)$ or $\Delta(ne_p-no_L)$, which determines a scattering property, may be adjusted to be small in a short wavelength side and large in a long wavelength side (reverse wavelength dispersion of refractive index). Wavelength dependence of scattering is adjusted in this way, thereby in-plane variation of light intensity distribution of illumination light may be reduced over the whole visible range.

The amount of long-wavelength light increases with increase in distance from a light source due to absorption of the ITO film. The amount of short-wavelength light increases in a region near the light source due to a scattering characteristic of the light modulation element. However, while the amount of short-wavelength light increases in the light guide plate due to reflection of the ITO film, long-wavelength light, which has not been reflected, enters the light modulation element. This increases the amount of long-wavelength light in light scattered in the light modulation element. When a distance from the light source further increases, long-wavelength light is consumed by scattering, and therefore the amount of short-wavelength light gradually increases in light outputted from the light guide plate. As a result, short-wavelength light, long-wavelength light and short-wavelength light are arranged in order from a light source side. Thus, one or more of the above measures is used, so that in-plane variation of light intensity distribution of illumination light may be reduced over the whole visible range.

According to the first and second lighting devices and the first and second display devices of the embodiments of the invention, respective optical axis directions of the first and second regions are adjusted to be equal to or different from each other by controlling an electric field, thereby a high transparent-property or a high scattering property may be achieved in all directions, and therefore light intensity of a light source may be partially modulated in the edge light type. Furthermore, according to the first lighting device and the first display device of the embodiments of the invention, when light emitted from the light source repeatedly passes through the light modulation element while propagating in the light guide plate, wavelength dependence of scattering is suppressed, which may reduce increase in long wavelength component of illumination light with increase in distance from the light source attached on an end of the light guide plate. According to the second a lighting device and the second display device of the embodiments of the invention, when light emitted from the light source repeatedly passes through the light modulation element while propagating in the light guide plate, wavelength dependence of absorption is suppressed, which may reduce increase in long wavelength component of illumination light with increase in distance from the light source attached on an end of the light guide plate. Consequently, in the first and second lighting devices and the first and second display devices according to the embodiments of the invention, in-plane variation of light intensity distribution of illumination light may be reduced over the whole visible range.

Other and further objects, features and advantages of the invention will appear more fully from the following description.

BRIEF DESCRIPTION OF THE DRAWINGS

FIGS. 20A and 20B are section diagrams showing an example of a light modulation element according to a second embodiment of the invention and a backlight having the light modulation element.

FIG. 27A shows an example of luminance in a white state of a small glass cell, and FIG. 27B shows an example of wavelength dependence of scattering in a white state of the small glass cell.

FIG. 29A shows an example of cell-thickness dependence of luminance in a white state of a small glass cell, and FIG. 29B shows an example of wavelength dependence of scattering in a white state of a small glass cell in cell thickness of 7 μm, 10 μm and 13.5 μm.

DETAILED DESCRIPTION OF THE PREFERRED EMBODIMENTS

Hereinafter, a preferred embodiment of the invention will be described in detail with reference to drawings. Description is made in the following sequence.

1. First embodiment (horizontal alignment PDLC, backlight) (FIGS. 1A to 19)
2. Second embodiment (vertical alignment PDLC, backlight) (FIGS. 20A to 22C)
3. Modifications (backlight) (FIGS. 23 to 30)
4. Application example (display device) (FIG. 31)

1. First Embodiment

Example of Using Horizontal Alignment PDLC

Figure 1A:
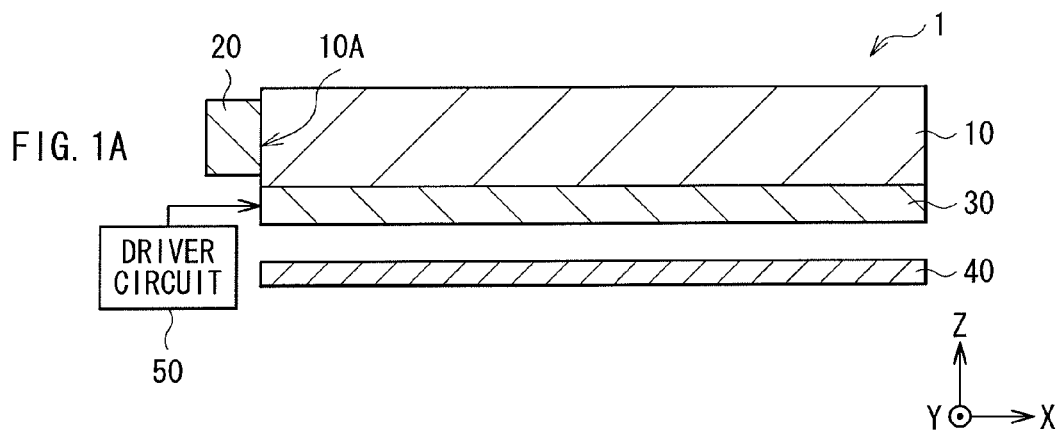
FIGS. 1A and 1B are section diagrams showing an example of a light modulation element according to a first embodiment of the invention and a backlight having the light modulation element.
Figure 1B:
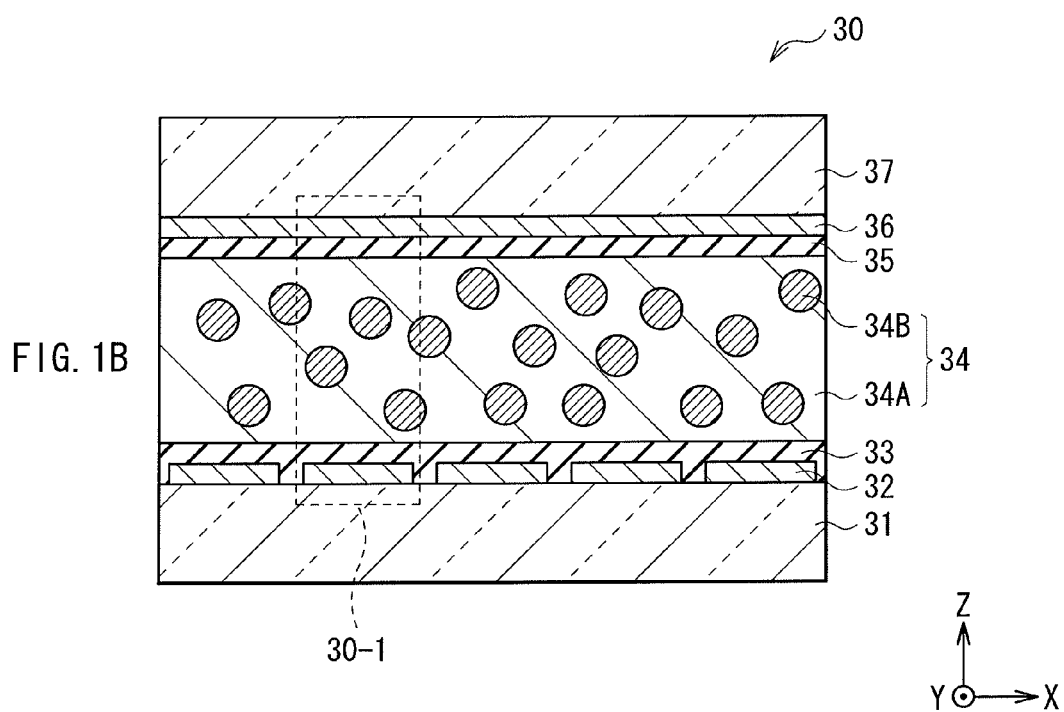

FIG. 1A shows an example of a sectional configuration of a backlight 1 according to a first embodiment of the invention. FIG. 1B shows an example of a sectional configuration of a light modulation element 30 in the backlight 1 of FIG. 1A. FIGS. 1A and 1B are schematic diagrams and therefore dimensions or shapes are not necessarily the same as actual ones. For example, the backlight 1 lights a liquid crystal display panel from the back, and includes a light guide plate 10, a light source 20 disposed on a side face of the light guide plate 10, a light modulation element 30 and a reflective plate 40 disposed behind the light guide plate 10, and a driver circuit 50 driving the light modulation element 30.

The light guide plate 10 guides light from the light source 20, disposed on the side face of the light guide plate 10, to a top of the light guide plate 10. The light guide plate 10 has a shape in correspondence to a display panel (not shown) disposed on the top of the light guide plate 10, for example, a rectangular shape enclosed by a top, a bottom and side faces. Hereinafter, among side faces of the light guide plate 10, a side face, through which light enters from the light source 20, is called light incidence surface 10A. The light guide plate 10 has, for example, a predetermined, patterned shape on one or both of the top and the bottom so as to have a function of scattering and equalizing light entering through the light incidence surface 10A. When luminance is equalized by modulation of voltage applied to the backlight 1, a non-patterned, flat light guide plate may be used as the light guide plate 10. For example, the light guide plate 10 further acts as a support supporting an optical sheet (for example, a diffuser plate, a diffuser sheet, a lens film or a polarization separation sheet) disposed between the display panel and the backlight 1. For example, the light guide plate 10 mainly includes transparent thermoplastic resin such as polycarbonate resin (PC) or acrylic resin (polymethyl methacrylate (PMMA)).

The light source 20 is a linear light source, and includes, for example, a hot cathode fluorescent lamp (HCFL), CCFL or a plurality of LEDs arranged in a line. When the light source 20 includes a plurality of LEDs, all the LEDs are preferably white LEDs from the viewpoint of efficiency, thickness reduction and uniformity. The light source 20 may include, for example, red LED, green LED and blue LED. The light source 20 may be provided on only one side face of the light guide plate 10 as shown in FIG. 1A, or may be provided on two, three or all side faces of the light guide plate 10.

The reflective plate 40 returns light, leaking from the back of the light guide plate 10 through the light modulation element 30, to the light guide plate 10, and has a function of, for example, reflecting, diffusing or scattering the light. Accordingly, light emitted from the light source 20 may be efficiently used, and besides front luminance is increased. The reflective plate 40 includes, for example, PET (polyethylene terephthalate) foam, a silver-deposited film, a multilayer reflected-film or white PET.

In the embodiment, the light modulation element 30 is adhered to the back (bottom) of the light guide plate 10 with no air layer in between, and, for example, attached to the back of the light guide plate 10 with an adhesive (not shown) in between. The light modulation element 30 includes, for example, a transparent substrate 31, a lower electrode 32, an alignment film 33, a light modulation layer 34, an alignment film 35, an upper electrode 36 and a transparent substrate 37 disposed in this order from a reflective plate 40 side, as shown in FIG. 1B.

The transparent substrate 31 and 37 support the light modulation layer 34, and typically includes a substrate transparent to visible light. A material of such a substrate includes, for example, glass or resin. A material of a resin substrate is not particularly limited as long as the material satisfies functions of a substrate set on a display surface of the display device 1. In particular, (meta) acrylic resin such as polymethyl methacrylate, a copolymer of methyl methacrylate and another alkyl (meta) acrylate, or a copolymer of methyl methacrylate and a vinyl monomer such as styrene may be used in the light of optical characteristic such as transparency, refractive index, dispersion, and birefringence, and of various characteristics of impact resistance, heat resistance and durability. As a material of the substrate transparent to visible light, polycarbonate resin such as polycarbonate or diethylene glycol bis(allyl carbonate) (CR-39) may be used. Moreover, as a material of the substrate transparent to visible light, thermosetting (meta) acrylic resin such as a homopolymer or copolymer of (brominated) bisphenol A type di(meta) acrylate, or polymer and copolymer of a urethane modified monomer of (brominated) bisphenol A type mono(meta) acrylate may be used. In addition, as a material of the substrate transparent to visible light, polyester, particularly, polyethylene terephthalate, polyethylene naphthalate, and unsaturated polyester, acrylonitrile-styrene copolymer, polyvinyl chloride, polyurethane, epoxy resin, polyarylate, polyether sulfone, polyether ketone, and cycloolefin polymer, for example, ARTON (registered trade mark of JSR Corporation) or ZEONOR (registered trade mark of ZEON CORPORATION) are preferably used. Moreover, as a material of the substrate transparent to visible light, aramid resin may be used in consideration of heat resistance.

Figure 2:
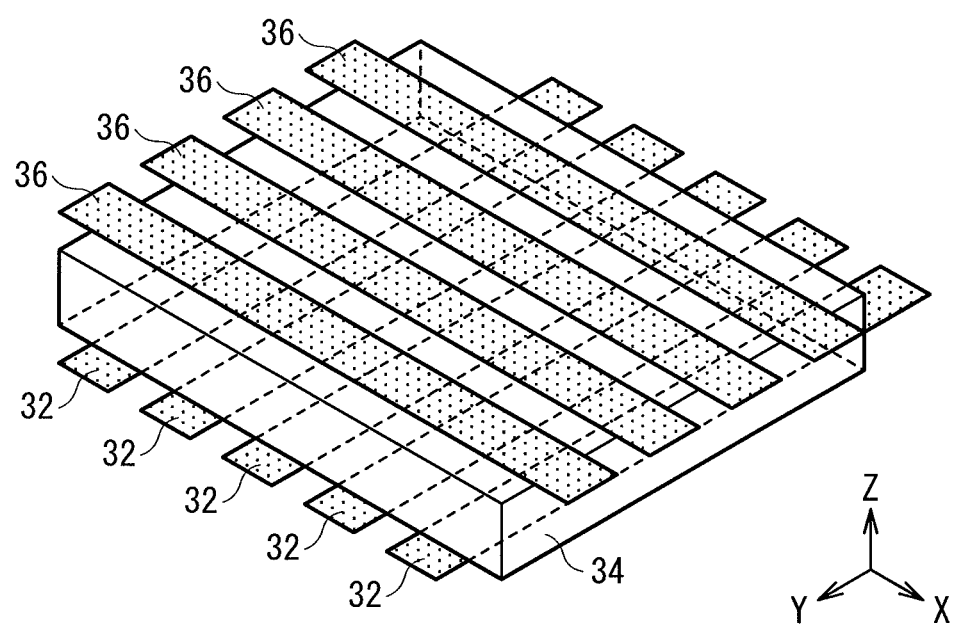
FIG. 2 is a diagram showing an example of a configuration of the light modulation element of FIG. 1B.

The lower electrode 32 is provided on a surface, facing the transparent substrate 37, of the transparent substrate 31, and, for example, formed in a strip shape extending in one direction in a plane as shown in FIG. 2 partially showing the light modulation element 30 in an extracted manner. The upper electrode 36 is provided on a surface, facing the transparent substrate 31, of the transparent substrate 37, and, for example, formed in a strip shape extending in one direction in a plane corresponding to a direction intersecting with (orthogonal to) the extending direction of the lower electrode 32.

A shape of each of the lower and upper electrodes 32 and 36 depends on a drive method. For example, when each electrode has a strip shape as above, the electrode may be driven by simple matrix drive. When one electrode is in a form of a solid film, and the other electrode is patterned in small rectangular electrodes, each rectangular electrode may be driven by, for example, active matrix drive. When one electrode is in a form of a solid film, and the other electrode is patterned in blocks having thin lead lines, for example, segment drive may be used so that each divided block may be independently driven.

The upper electrode 36 (electrode on a side near a top of the backlight 1) or both of the lower and upper electrodes 32 and 36 are formed of a transparent conductive film. The transparent conductive film preferably has a surface resistance value of 50 to 10,000 ohms per square both inclusive in consideration of use as an electrode. In addition, physical thickness d of the transparent conductive film preferably satisfies 1 nm<d<250 nm, and more preferably satisfies 10 nm<d<30 nm in consideration of securing sufficient conductivity with the above surface resistance value while controlling light absorption.

Figure 3A:
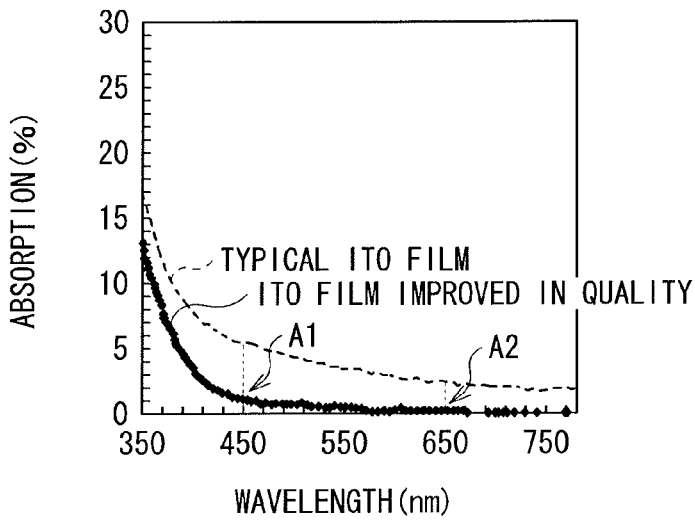
FIGS. 3A to 3C are graphs showing an example of an optical characteristic of an ITO film and an example of position dependence of chromaticity change of backlight.
Figure 3B:
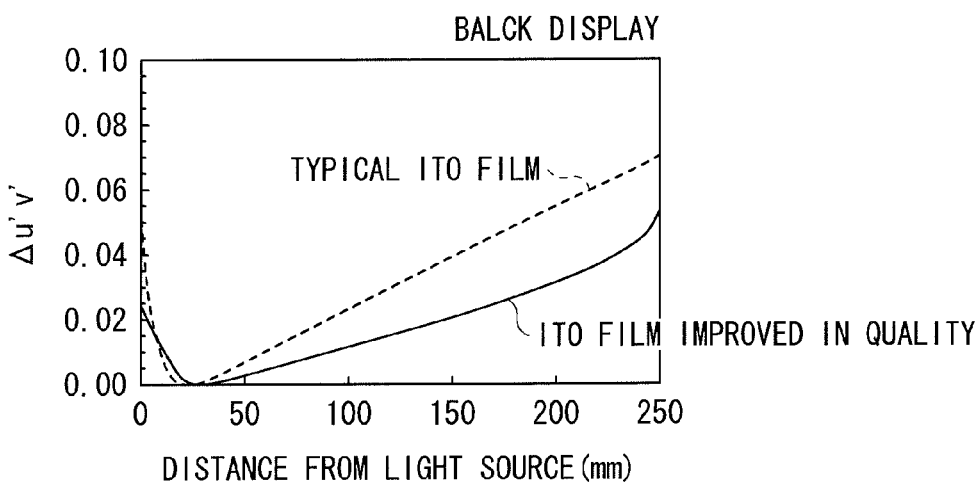
Figure 3C:
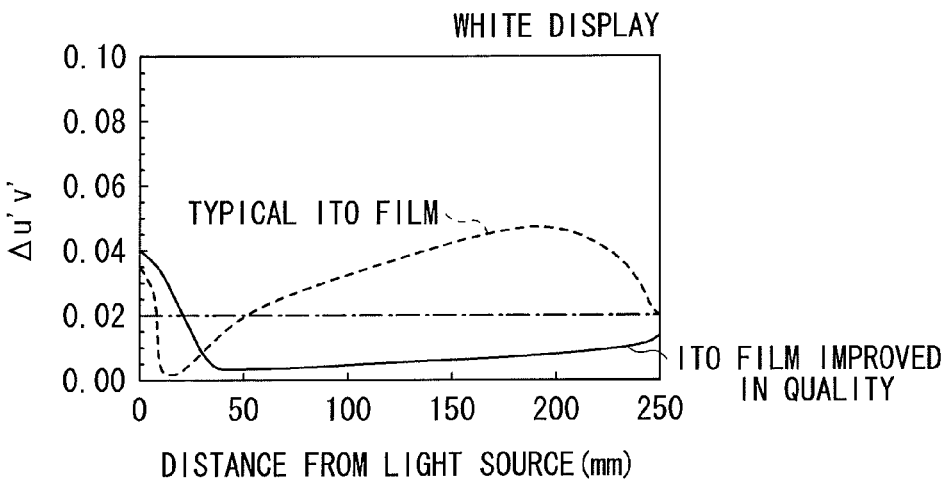
Figure 4A:
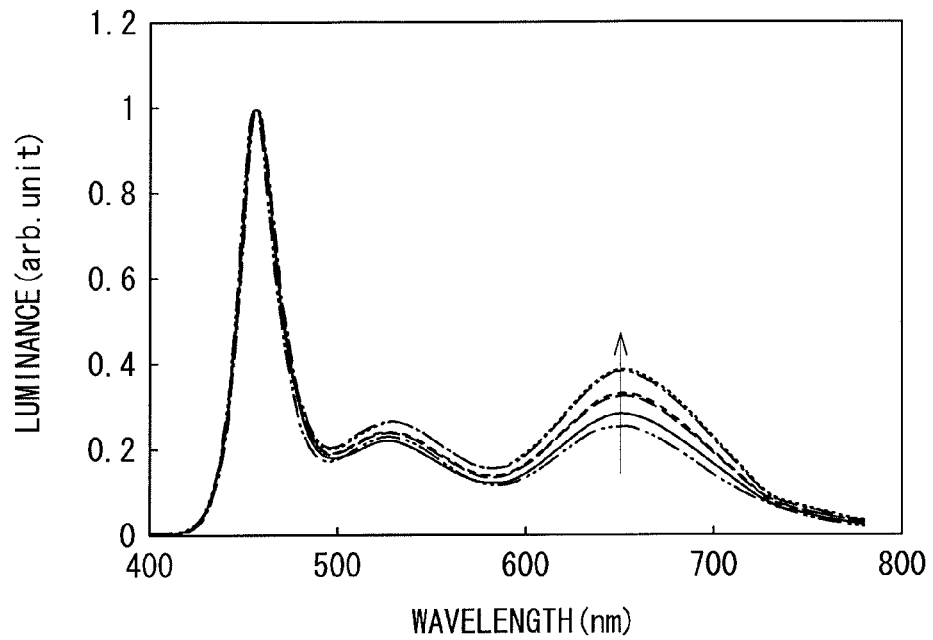
FIGS. 4A and 4B are graphs showing an example of position dependence of a guided-light spectrum.
Figure 4B:
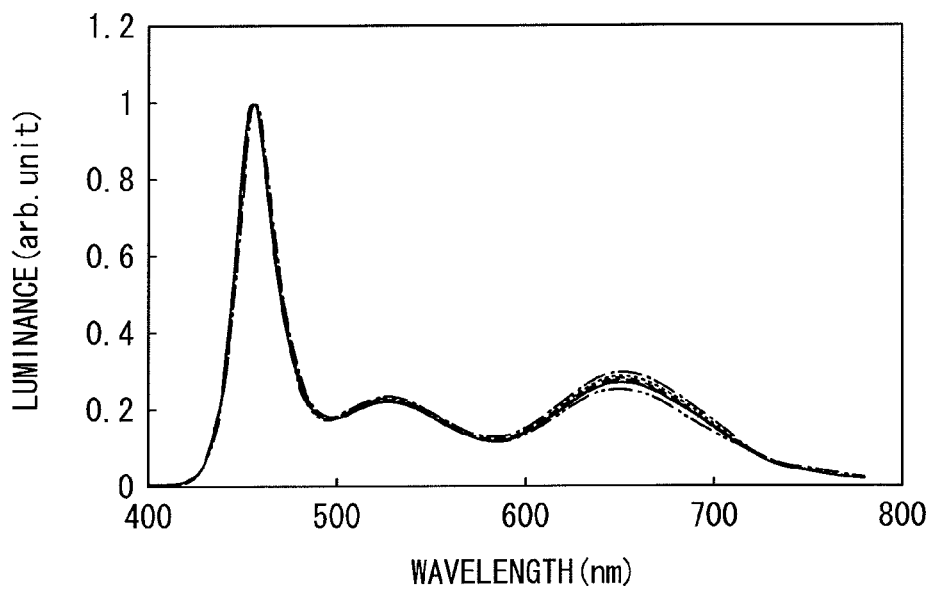

FIG. 3A shows an example of wavelength dependence of an optical characteristic of an ITO film. FIGS. 3B and 3C show an example of position dependence of chromaticity change of a backlight. $\Delta u'v'$ as the vertical axis of FIGS. 3B and 3C is an index corresponding to increase in a long-wavelength component with increase in value of the $\Delta u'v'$. FIGS. 4A and 4B show an example of wavelength dependence of a guided-light spectrum.

The transparent conductive film preferably has, for example, a property as expressed by the following formula. The transparent conductive film is formed of a film (hereinafter, called ITO film) including, for example, indium tin oxide (ITO). The lower electrode 32 and the upper electrode 36 may be formed of indium zinc oxide (IZO), metal nanowire, carbon nanotube or the like.

$$|A1-A2| \leq 2.00$$

A1: maximum light absorptance in 450 nm to 650 nm (%) both inclusive
A2: minimum light absorptance in 450 nm to 650 nm (%) both inclusive Since visible light is used as illumination light, variation of light absorption of the transparent conductive film is preferably small within a range of 380 nm to 780 nm both inclusive. Difference between a maximum value and a minimum value of light absorptance is preferably 10.00 or less within the range of 380 nm to 780 nm both inclusive, and more preferably 7.00 or less. In particular, when the transparent conductive film is used for a backlight or the like, difference between the maximum value and the minimum value of light absorptivity is preferably 2.00 or less within a wavelength range of a light source to be used. More preferably, the difference is 1.00 or less within the range, and still more preferably 0.5 or less. In the case of using typical LED as a light source, difference between the maximum value and the minimum value of light absorptivity is preferably 2.00 or less within a range of 450 nm to 650 nm both inclusive, more preferably 1.00 or less (solid line in FIG. 3A), and still more preferably 0.5 or less (dashed line in FIG. 3A). In measurement of absorptivity, V-550 manufactured by JASCO Corporation is used, and reflectance and transmittance are measured at an incident angle of 5 degrees from a normal direction of a substrate, and a value of 100% minus the reflectance and transmittance is assumed as absorptivity.

In the case that the transparent conductive film has the property as expressed by the above formula, when light emitted from the light source 20 repeatedly passes through the transparent conductive film in the light modulation element 30 while propagating in the light guide plate 10, wavelength dependence of absorption of the transparent conductive film is suppressed. In the case that the transparent conductive film includes a typical ITO film, a long-wavelength component increases with increase in distance from the light source 20, for example, as shown by broken lines in FIGS. 3B and 3C and an arrow in FIG. 4A. In contrast, in the case that the transparent conductive film includes the ITO film with film quality improved so as to have the property as expressed by the above formula, a long-wavelength component varies at a lower rate with a distance from the light source 20, for example, as shown by solid lines in FIGS. 3B and 3C and by FIG. 4B.

For example, when one or both of the pair of electrodes in the light modulation element is formed of a film including ITO (hereinafter, called ITO film), for example a dye or pigment absorbing a large amount of long-wavelength light compared with short-wavelength light is preferably contained in some portion of a light path for guiding light (for example, one or both of the light guide plate and the light modulation element). A known material may be used as the dye or pigment. In particular, when a light modulation layer is formed through a process including ultraviolet irradiation, for example, after a light modulation element is formed, a light guide plate containing the dye or pigment is preferably attached to the light modulation element, or a portion containing the dye or pigment is preferably protected from ultraviolet rays by an ultraviolet absorption layer to prevent the dye or pigment from being damaged by ultraviolet rays. The dye or pigment is added into some portion of a light path for guiding light in this way, thereby when light emitted from the light source repeatedly passes through the light modulation element while propagating in the light guide plate, wavelength dependence of absorption of the light modulation element including an ITO film is suppressed.

Figure 5:
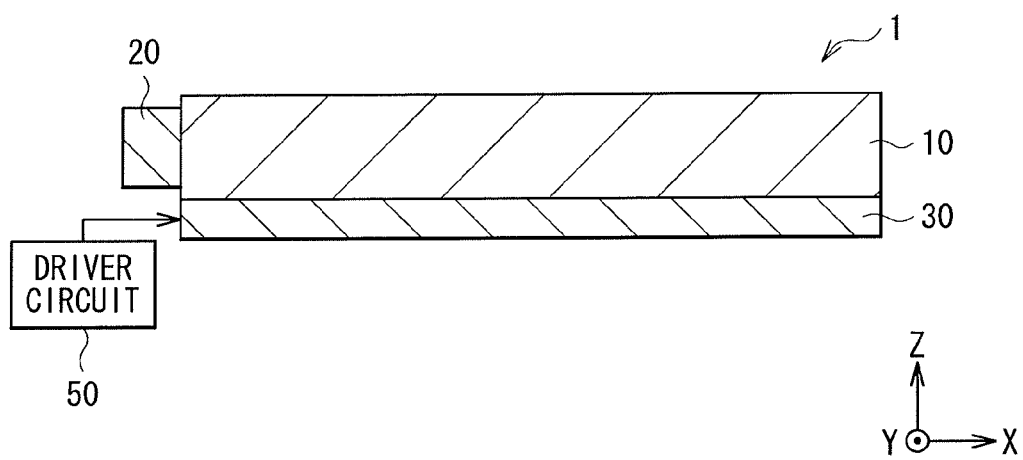
FIG. 5 is a section diagram showing another example of a configuration of the backlight of FIG. 1A.

However, the lower electrode 32 (electrode on a side near a bottom of the backlight 1) need not include a transparent material, and, for example, may be formed of metal. In the case that the lower electrode 32 is formed of metal, the lower electrode further has a function of reflecting light entering the light modulation element 30 from the back of the light guide plate 10, similarly as the reflective plate 40. In this case, the reflective plate 40 may not be provided, for example, as shown in FIG. 5.

Some sort of optical layer may be provided between the transparent substrate 37 and the upper electrode 36. For example, when the upper electrode 36 (electrode on a side near a top of the backlight 1) or both of the lower and upper electrodes 32 and 36 are formed of an ITO film, a layer may be provided between the transparent substrate 37 and the upper electrode 36 to relax influence of an optical property of the ITO film.

Figure 6:
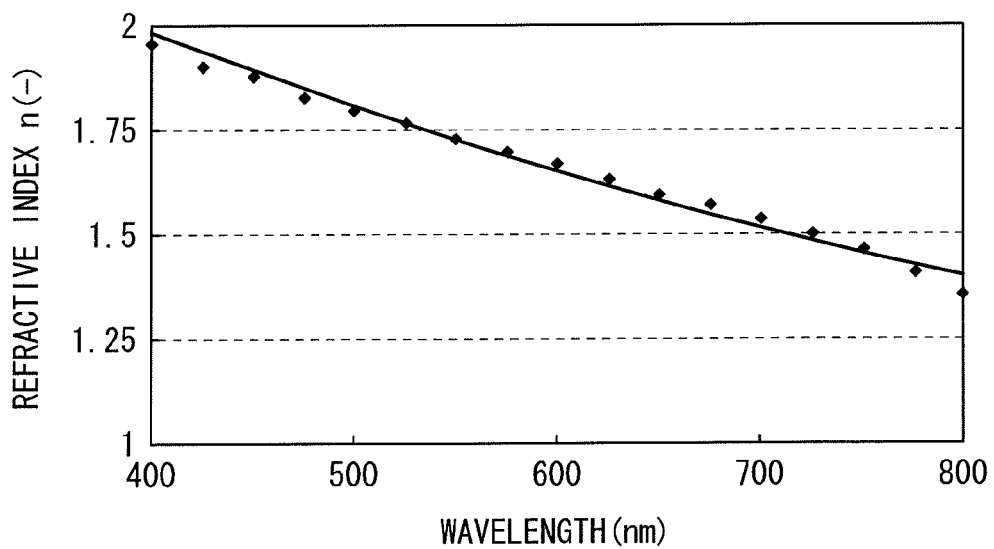
FIG. 6 is a graph showing an example of wavelength dependence of a refractive index of an ITO film.
Figure 7:
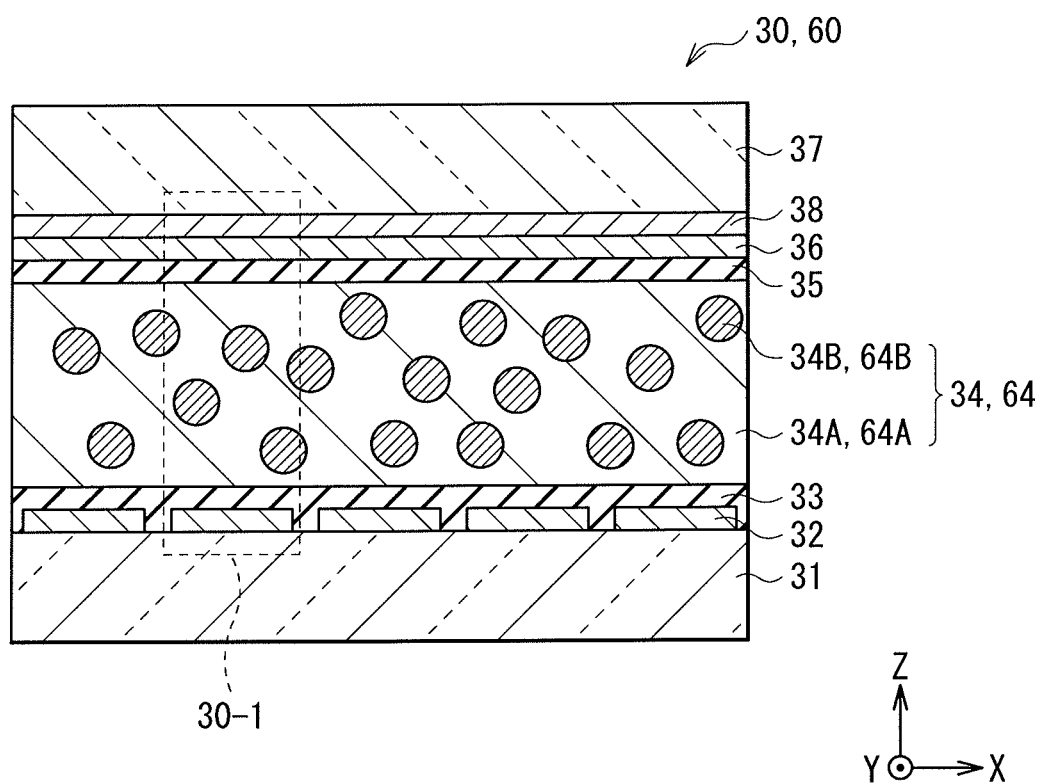
FIG. 7 is a section diagram showing another example of the light modulation element of FIG. 1B.

Here, the ITO film has a property where a refractive index is high in a short wavelength range and low in a long wavelength range, for example, as shown in FIG. 6. Therefore, a reflectance of the ITO film is high in a short wavelength range and low in a long wavelength range. As a result, when light enters into the ITO film from a light guide plate 10 side and reflected by the ITO film, such reflected light contains a large amount of short-wavelength light component in a region near the light source 20, and the amount of short-wavelength light component further increases with increase in distance from the light source 20. However, for example, as shown in FIG. 7, in the case that an optical multilayer film 38 whose reflectance is low in a short wavelength range compared with in a long wavelength range is provided on the upper electrode 36, when light emitted from the light source 20 repeatedly enters into the ITO film in the light modulation element 30 while propagating in the light guide plate 10, wavelength dependence of reflection of the ITO film is suppressed by an effect of the optical multilayer film 38. For example, the optical multilayer film 38 is formed by alternately stacking low-refractive-index layers including silicon dioxide and high-refractive-index layers including niobium pentoxide.

When the electrodes 32 and 36 are viewed in a normal direction of the light modulation element 30, the lower electrode 32 faces the upper electrode 36 at certain points, and portions corresponding to the points form light modulation cells 30-1. Each light modulation cell 30-1 may be independently driven by applying a predetermined voltage between the lower electrode 32 and the upper electrode 36, and exhibits a transparent property or a scattering property with respect to light from the light source 20 depending on a voltage value applied between the lower electrode 32 and the upper electrode 36. The transparent property and the scattering property are described in detail in description of the light modulation layer 34.

For example, the alignment film 33 or 35 aligns a liquid crystal or a monomer used for the light modulation layer 34. A type of the alignment film includes, for example, a vertical alignment film and a horizontal alignment film, and the horizontal alignment film is used for the alignment film 33 or 35 in the embodiment. The horizontal alignment film includes, for example, an alignment film formed through rubbing treatment of polyimide, polyamideimide, polyvinyl alcohol, or an alignment film with grooves added by transfer or etching. Moreover, the horizontal alignment film includes, for example, an alignment film formed by obliquely evaporating an inorganic material such as silicon oxide, an alignment film of diamond-like carbon formed by ion beam irradiation, and an alignment film with electrode pattern slits formed therein. When a plastic film is used for the transparent substrate 31 or 37, since baking temperature is preferably as low as possible after the alignment film 33 or 35 is coated on a surface of the transparent substrate 31 or 37 in a manufacturing process, polyamideimide is preferably used for the alignment film 33 or 35 since a film of polyamideimide may be formed at a temperature of 100° C. or lower.

Either of the vertical and horizontal alignment films only needs to have a function of aligning the liquid crystal and the monomer, and need not have reliability against repeated voltage application while the reliability is demanded in a typical liquid crystal display. The reason is as follows: after a device is formed, reliability against voltage application largely depends on an interface between a polymerized product of a monomer and a liquid crystal. Even if the alignment film is not used, the liquid crystal and the monomer used for the light modulation layer 34 may be aligned, for example, by applying an electric field or a magnetic field between the lower electrode 32 and the upper electrode 36. That is, an alignment state of the liquid crystal or the monomer under voltage application may be fixed by performing ultraviolet irradiation while an electric field or a magnetic field is applied between the lower electrode 32 and the upper electrode 36. When voltage is used to form the alignment film, electrodes are separately formed for each of alignment and drive. Alternatively, a two-frequency liquid crystal, where a sign of dielectric anisotropy is reversed depending on frequencies, may be used as a liquid crystal material. When a magnetic field is used to form the alignment film, a material having large magnetic-susceptibility anisotropy, for example, a material having many benzene rings is preferably used for the alignment film.

The light modulation layer 34 is, for example, a composite layer including a bulk 34A (second region) and a plurality of fine particles 34B (first region) dispersed in the bulk 34A as shown in FIG. 1B. The bulk 34A and the fine particles 34B have optical anisotropy.

Figure 8A:
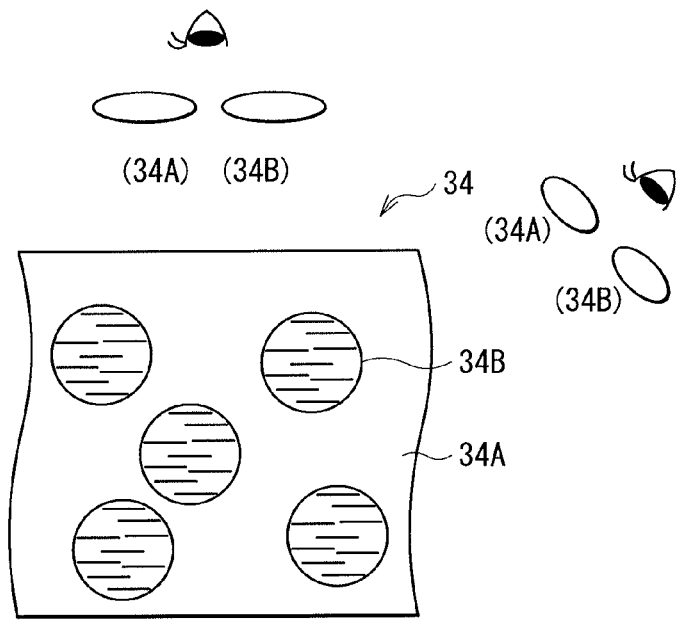
FIGS. 8A to 8C are schematic diagrams illustrating operation of the light modulation element of FIG. 1B.
Figure 8B:
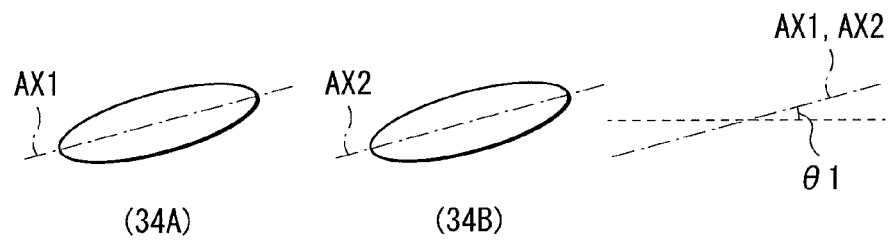
Figure 8C:
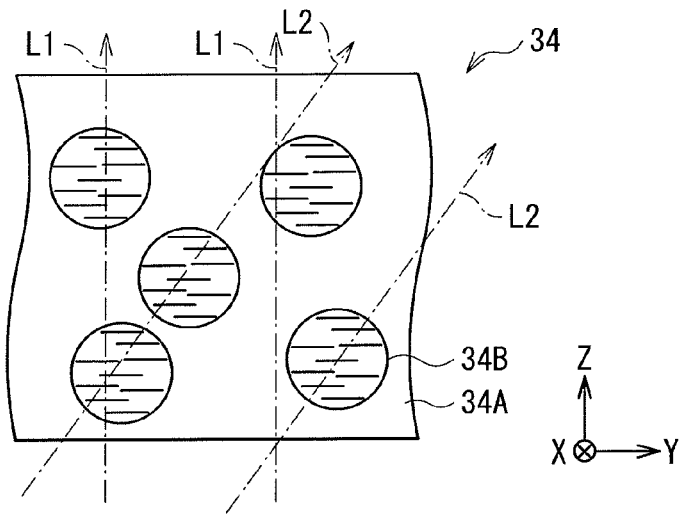

FIG. 8A schematically shows an example of an alignment state in the fine particles 34B in the case that voltage is not applied between the lower and upper electrodes 32 and 36. In FIG. 8A, an alignment state in the bulk 34A is omitted to be shown. FIG. 8B shows an example of an optical indicatrix showing refractive-index anisotropy of each of the bulk 34A and the fine particle 34B in the case that voltage is not applied between the lower and upper electrodes 32 and 36. The optical indicatrix shows refractive indices of linearly polarized light entering from various directions by a tensor ellipsoid, where a refractive index may be geometrically known through observation of a section of an ellipsoid from a light incidence direction. FIG. 8C schematically shows an example of an aspect where light L1 going in a front direction and light L2 going in an oblique direction are transmitted by the light modulation layer 34 in the case that voltage is not applied between the lower and upper electrodes 32 and 36.

Figure 9A:
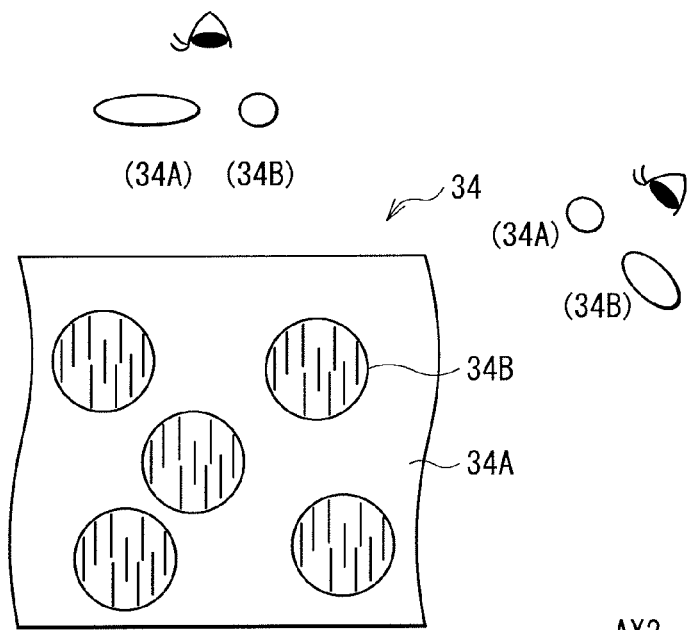
FIGS. 9A to 9C are schematic diagrams illustrating operation of the light modulation element of FIG. 1B.
Figure 9B:
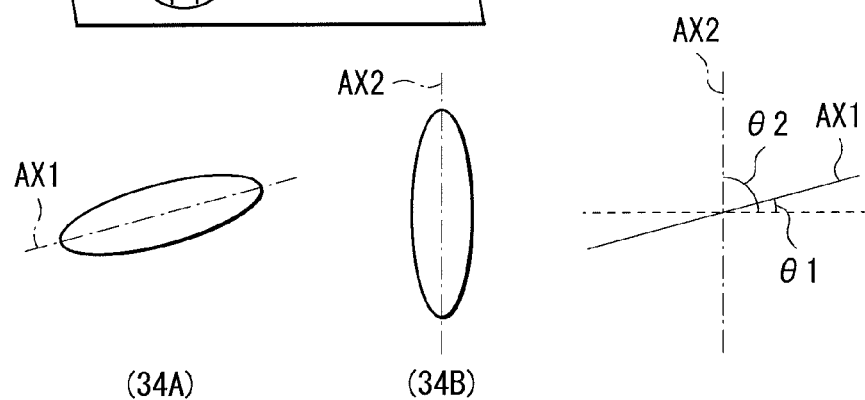
Figure 9C:
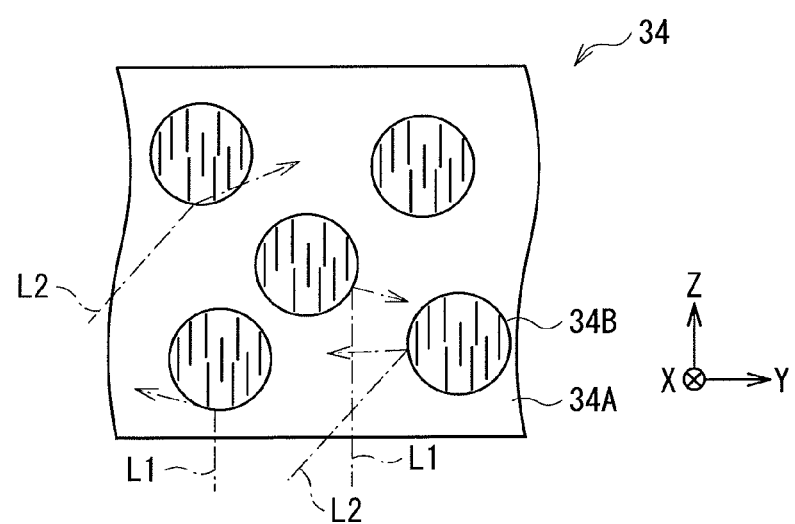

FIG. 9A schematically shows an example of an alignment state in the fine particles 34B in the case that voltage is applied between the lower and upper electrodes 32 and 36. In FIG. 9A, an alignment state in the bulk 34A is omitted to be shown. FIG. 9B shows an example of an optical indicatrix showing refractive-index anisotropy of each of the bulk 34A and the fine particle 34B in the case that voltage is applied between the lower and upper electrodes 32 and 36. FIG. 9C schematically shows an example of an aspect where light L1 going in a front direction and light L2 going in an oblique direction are scattered by the light modulation layer 34 in the case that voltage is applied between the lower and upper electrodes 32 and 36.

The bulk 34A and the fine particle 34B are designed such that when voltage is not applied between the lower and upper electrodes 32 and 36, a direction of an optical axis AX1 of the bulk 34A is equal (parallel) to a direction of an optical axis AX2 of the fine particle 34B, for example, as shown in FIGS. 8A and 8B. The optical axis AX1 or AX2 refers to a line parallel to a forward direction of a beam, where a refractive index has one value regardless of a polarization direction. A direction of the optical axis AX1 and a direction of the optical axis AX2 need not accurately correspond to each other, and may be somewhat different due to, for example, manufacturing errors.

For example, the fine particle 34B is designed such that when voltage is not applied between the lower and upper electrodes 32 and 36, the optical axis AX2 is parallel to the light incidence surface 10A of the light guide plate 10. Furthermore, the fine particle 34B is designed such that when voltage is not applied between the lower and upper electrodes 32 and 36, the optical axis AX2 intersects with a surface of the transparent substrate 31 or 37 at a slight angle θ1 (see FIG. 8B). The angle θ1 is described in detail in description of a material forming the fine particle 34B.

For example, the bulk 34A is designed such that the optical axis AX1 is constant regardless of presence of voltage applied between the lower and upper electrodes 32 and 36. Specifically, the bulk 34A is designed such that the optical axis AX1 is parallel to the light incidence surface 10A of the light guide plate 10, and intersects with the surface of the transparent substrate 31 or 37 at a predetermined angle θ1, for example, as shown in FIGS. 8A and 8B and FIGS. 9A and 9B. That is, the optical axis AX1 of the bulk 34A is parallel to the optical axis AX2 of the fine particle 34B in the case that voltage is not applied between the lower and upper electrodes 32 and 36.

The optical axis AX2 need not accurately intersect with the surface of the transparent substrate 31 or 37 at the angle θ1 while being parallel to the light incidence surface 10A of the light guide plate 10, and may intersect with the surface at an angle slightly different from the angle θ1 due to, for example, manufacturing errors. In addition, the optical axis AX1 or AX2 need not be accurately parallel to the light incidence surface 10A of the light guide plate 10, and may intersect with the light incidence surface 10A at a slight angle due to, for example, manufacturing errors.

Figure 10A:
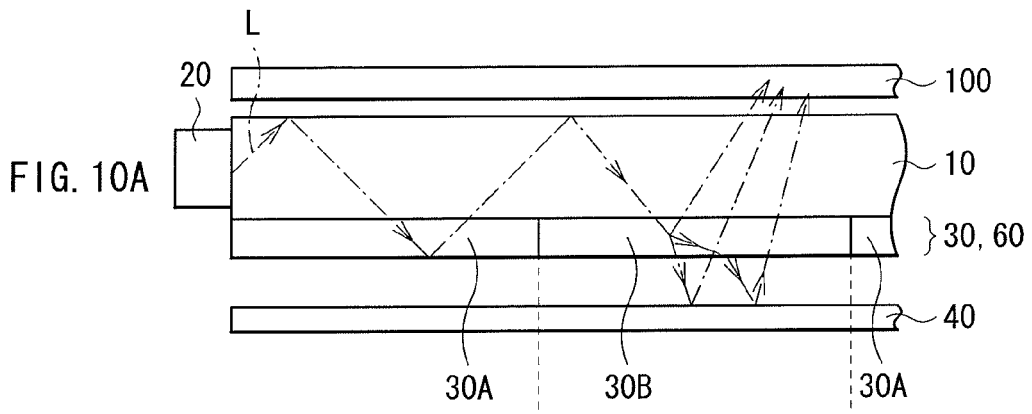
FIG. 10 is a diagram illustrating operation of the backlight of FIG. 1A.
Figure 10B:
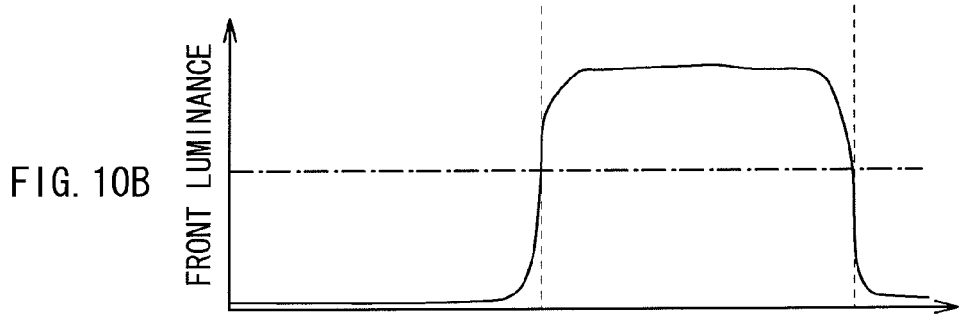
Figure 11:
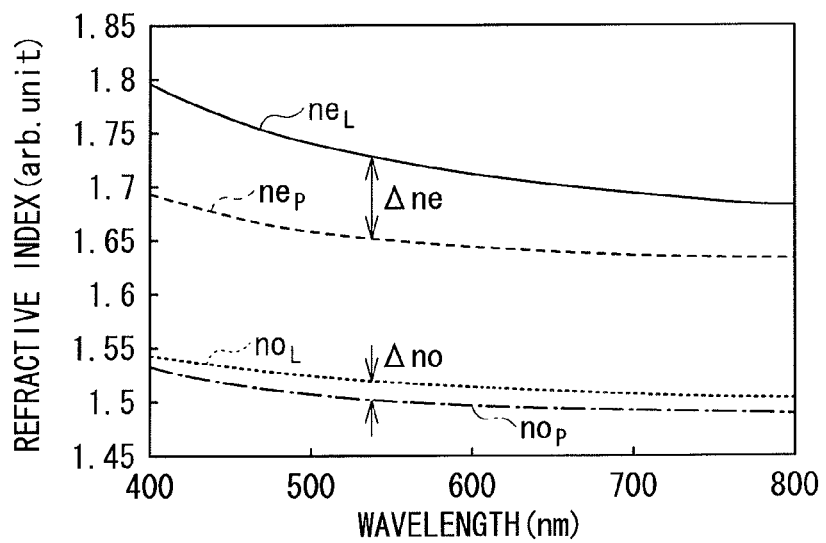
FIG. 11 is a graph showing an example of an optical characteristic of the light modulation layer in FIG. 1B.

Preferably, an ordinary refractive index of the bulk 34A is equal to an ordinary refractive index of the fine particle 34B, and an extraordinary refractive index of the bulk 34A is also equal to an extraordinary refractive index of the fine particle 34B. In such a case, for example, when voltage is not applied between the lower and upper electrodes 32 and 36, refractive-index difference is substantially zero in all directions including front and oblique directions as shown in FIG. 8A, leading to a high transparent-property. Accordingly, the light L1 going in a front direction and the light L2 going in an oblique direction are not scattered within the light modulation layer 34 and thus transmitted by the layer 34, for example, as shown in FIG. 8C. As a result, for example, as shown in FIGS. 10A and 10B, light L from the light source 20 (light in an oblique direction) is completely reflected at a boundary of the transparent region 30A (an interface between the transparent substrate 31 or the light guide plate 10 and air), and therefore luminance in the transparent region 30A (luminance of black display) is decreased compared with a case where the light modulation element 30 is not provided (dashed line in FIG. 10B).

For example, the bulk 34A and the fine particle 34B are designed such that when voltage is applied between the lower and upper electrodes 32 and 36, a direction of the optical axis AX1 is different from (intersects with) a direction of the optical axis AX2 as shown in FIG. 9A. For example, the fine particle 34B is designed such that when voltage is applied between the lower and upper electrodes 32 and 36, the optical axis AX2 of the fine particle 34B is parallel to the light incidence surface 10A of the light guide plate 10, and intersects with the surface of the transparent substrate 31 or 37 at an angle θ2 (for example, 90°) larger than the angle θ1. The angle θ2 is described in detail in description of the material forming the fine particle 34B.

Therefore, when voltage is applied between the lower and upper electrodes 32 and 36, refractive-index difference is large in all directions including front and oblique directions in the light modulation layer 34, leading to a high scattering property. Accordingly, the light L1 going in a front direction and the light L2 going in an oblique direction are scattered within the light modulation layer 34, for example, as shown in FIG. 9C. As a result, light L (light in an oblique direction) from the light source 20 passes through a boundary (interface between the transparent substrate 31 or the light guide plate 10 and air) of the scattering region 30B (region where a scattering property is exhibited in the light modulation layer 34), and light transmitted to a reflective plate 40 side is reflected by the reflective plate 40 and then transmitted by the light modulation element 30, for example, as shown in FIGS. 10A and 10B. Therefore, luminance in the scattering region 30B is extremely high compared with a case of a printed light guide plate (the dashed line in FIG. 10B), and besides luminance of partial white display (luminance enhancement) is increased in correspondence to decrease in luminance in the transparent region 30A.

The ordinary refractive index of the bulk 34A is preferably equal to the ordinary refractive index of the fine particle 34B, but may be somewhat different from each other due to, for example, manufacturing errors. For example, such difference (refractive index difference $\Delta_{no}$) is preferably 0.1 or less in a visible range (see FIG. 11). Similarly, the extraordinary refractive index of the bulk 34A is preferably equal to the extraordinary refractive index of the fine particle 34B, but may be somewhat different from each other due to, for example, manufacturing errors. For example, such difference (refractive index difference $\Delta_{ne}$) is preferably 0.1 or less in a visible range (see FIG. 11).

Refractive-index difference of the bulk 34A ($\Delta n_p$=extraordinary refractive index $ne_p$-ordinary refractive index $no_p$) or refractive-index difference of the fine particle 34B ($\Delta n_L$=extraordinary refractive index $ne_L$-ordinary refractive index $no_L$) is preferably as large as possible, and is preferably 0.05 or more, more preferably 0.1 or more, and still more preferably 0.15 or more. In addition, difference (refractive-index difference $\Delta(ne_L-no_p)$) between the extraordinary refractive index $ne_L$ of the fine particle 34B and the ordinary refractive index $no_p$ of the bulk 34A is preferably 0.1 or more in a visible range, and difference (refractive-index difference $\Delta(ne_p-no_L)$) between the extraordinary refractive index $ne_p$ of the bulk 34A and the ordinary refractive index $no_L$ of the fine particle 34B is preferably 0.1 or more in a visible range. In such cases, scattering ability of the light modulation layer 34 is improved, so that a light guide condition may be easily broken, and consequently light from the light guide plate 10 is easily extracted.

Figure 12:
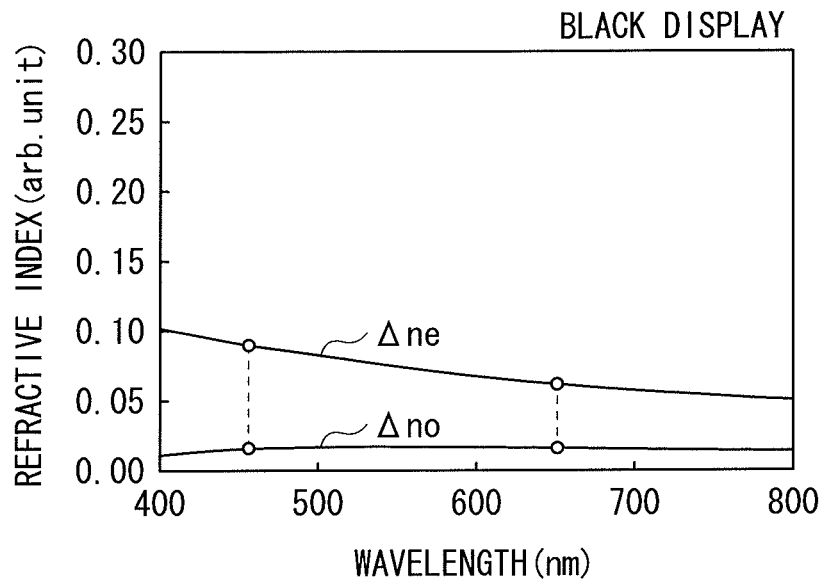
FIG. 12 is a graph showing an example of an optical characteristic in black display of the light modulation layer in FIG. 1B.

The bulk 34A and the fine particle 34B are preferably in a relationship as expressed by the following formulas (1) and (2), and more preferably in a relationship as expressed by the following formulas (3) and (4) (see FIG. 12).

$$|\Delta ne(450\ nm) - \Delta ne(650\ nm)| \leq 0.059 \quad (1)$$

$$|\Delta no(450\ nm) - \Delta no(650\ nm)| \leq 0.059 \quad (2)$$

$$|\Delta ne(450\ nm) - \Delta ne(650\ nm)| \leq 0.032 \quad (3)$$

$$|\Delta no(450\ nm) - \Delta no(650\ nm)| \leq 0.032 \quad (4)$$

Figure 13:
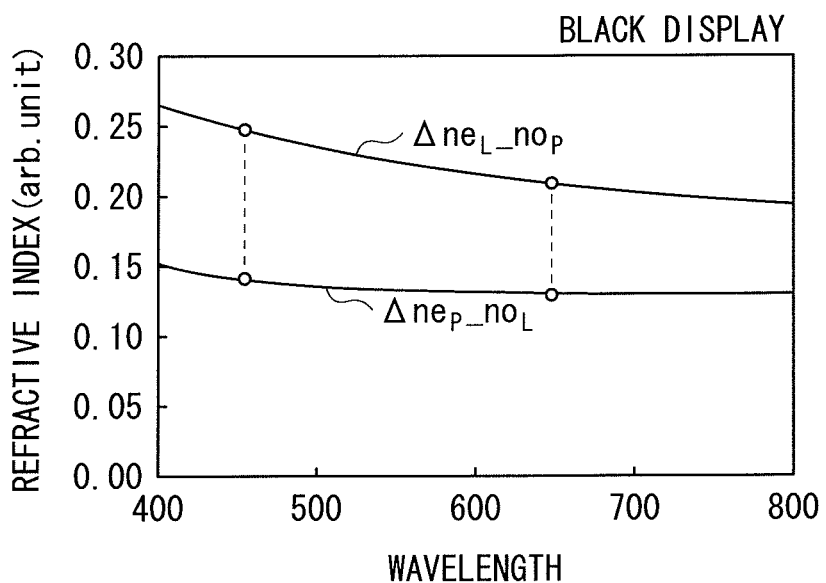
FIG. 13 is a graph showing an example of an optical characteristic in white display of the light modulation layer in FIG. 1B.

Δne (450 nm): Δne at 450 nm
Δne (650 nm): Δne at 650 nm
$\Delta ne = ne_L - ne_p$
Δno (450 nm): Δno at 450 nm
Δno (650 nm): Δno at 650 nm
$\Delta no = no_L - no_p$ Moreover, the bulk 34A and the fine particle 34B are preferably in a relationship as expressed by the following formulas (5) and (6), and more preferably in a relationship as expressed by the following formulas (7) and (8) (see FIG. 13).

$$|\Delta(ne_L-no_p)(450\ nm) - \Delta(ne_L-no_p)(650\ nm)| \leq 0.080 \quad (5)$$

$$|\Delta(ne_p-no_L)(450\ nm) - \Delta(ne_p-no_L)(650\ nm)| \leq 0.080 \quad (6)$$

$$|\Delta(ne_L-no_p)(450\ nm) - \Delta(ne_L-no_p)(650\ nm)| \leq 0.044 \quad (7)$$

$$|\Delta(ne_p-no_L)(450\ nm) - \Delta(ne_p-no_L)(650\ nm)| \leq 0.044 \quad (8)$$

Figure 14A:
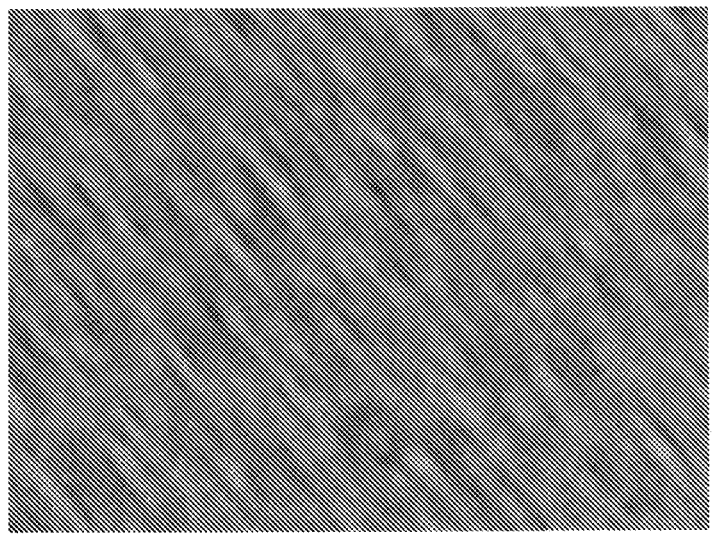
FIGS. 14A and 14B are photographs showing an example of a striped structure of a bulk in FIG. 1B.
Figure 14B:
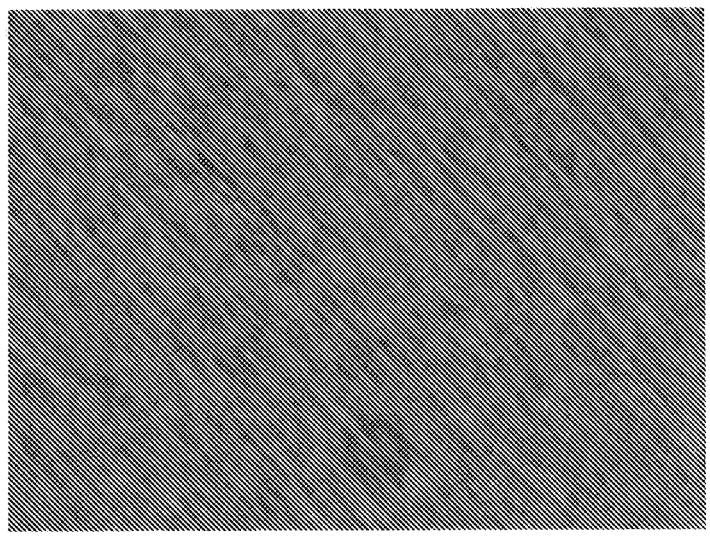

$\Delta(ne_L-no_p)$ (450 nm): $ne_L-no_p$ at 450 nm
$\Delta(ne_L-no_p)$ (650 nm): $ne_L-no_p$ at 650 nm
$\Delta ne_L-no_p=ne_L-no_p$
$\Delta(ne_p-no_L)$ (450 nm): $ne_p-no_L$ at 450 nm
$\Delta(ne_p-no_L)$ (650 nm): $ne_p-no_L$ at 650 nm
$\Delta(ne_p-no_L)=ne_p-no_L$ The bulk 34A and the fine particle 34B are different in response speed to an electric field. The bulk 34A has, for example, a striped structure (see FIGS. 14A and 14B) or porous structure unresponsive to an electric field, or a rod-like structure having a slower response speed than that of the fine particle 34B. FIGS. 14A and 14B are polarized microscope photographs in the case that an electric field is applied to the light modulation element 30, where striped, bright portions in the figures correspond to the striped structure. FIG. 14A shows an aspect of a striped structure of the bulk 34A with a weight ratio 95:5 of a liquid crystal to a monomer, and FIG. 14B shows an aspect of a striped structure of the bulk 34A with a weight ratio 90:10 of a liquid crystal to a monomer. The bulk 34A is, for example, formed of a polymer material obtained by polymerizing a low-molecular monomer. The bulk 34A is, for example, formed by polymerizing an alignable and polymerizable material (for example, monomer) by one or both of heat and light, the material being aligned along an alignment direction of the fine particle 34B or of the alignment films 33 and 35.

When the bulk 34A has, for example, the striped structure, average striped texture size in a short axis direction is preferably 0.05 µm to 10 µm both inclusive from the viewpoint of increasing scattering of guided light, and more preferably 0.2 µm to 7 µm both inclusive. In the case that the average striped texture size in a short axis direction is 0.05 µm to 10 µm both inclusive, scattering ability in the light modulation element 30 is approximately even over a visible range of 380 nm to 780 nm both inclusive. Therefore, light of a particular wavelength component is prevented from being exclusively increased or decreased in a plane, and therefore light balance may be achieved in a plane over the visible range. When the average striped texture size in a short axis direction is less than 0.05 µm or is more than 10 µm, scattering ability of the light modulation element 30 is low regardless of wavelengths, and therefore the light modulation element 30 does not operate as the light modulation element.

From the viewpoint of reducing wavelength dependence of scattering, the average striped texture size in a short axis direction is preferably 0.5 µm to 5 µm both inclusive, and more preferably 1 µm to 3 µm both inclusive. In such a case, when light emitted from the light source 20 repeatedly passes through the bulk 34A in the light modulation element 30 while propagating in the light guide plate 10, wavelength dependence of scattering of the bulk 34A is suppressed. Size of the striped texture may be observed by a polarized microscope, a confocal microscope or an electron microscope.

The fine particle 34B mainly includes, for example, a liquid crystal material, and thus has a response speed sufficiently faster than that of the bulk 34A. The liquid crystal material (liquid crystal molecules) in the fine particle 34B includes, for example, rod-like molecules. For example, liquid crystal molecules having positive dielectric anisotropy (so-called positive liquid crystal) are used as the liquid crystal molecules in the fine particle 34B.

When voltage is not applied between the lower and upper electrodes 32 and 36, a long axis direction of each liquid crystal molecule is parallel to the optical axis AX1 in the bulk 34A. Here, the long axis of the liquid crystal molecule in the fine particle 34B is parallel to the light incidence surface 10A of the light guide plate 10 and intersects with the surface of the transparent substrate 31 or 37 at a slight angle θ1. That is, when voltage is not applied between the lower and upper electrodes 32 and 36, the liquid crystal molecule in the fine particle 34B is aligned with a tilt of the angle θ1 in a plane parallel to the light incidence surface 10A of the light guide plate 10. The angle θ1 is called pre-tilt angle, and, for example, preferably within a range of 0.1° to 30° both inclusive. The angle θ1 is more preferably within a range of 0.5° to 10° both inclusive, and still more preferably within a range of 0.7° to 2° both inclusive. When the angle θ1 is increased, scattering efficiency tends to be reduced due to a reason described later. On the other hand, an excessively small angle θ1 causes variation in an azimuth at which a liquid crystal rises up upon voltage application. For example, a liquid crystal may rise up in a 180-degree opposite direction (reverse tilt). Accordingly, since refractive-index difference between the fine particle 34B and the bulk 34A may not be effectively used, scattering efficiency is reduced, and therefore luminance tends to be reduced.

When voltage is applied between the lower and upper electrodes 32 and 36, the long axis direction of the liquid crystal molecule intersects with (or is orthogonal to) the optical axis AX1 in the bulk 34A. Here, the long axis of the liquid crystal molecule in the fine particle 34B is parallel to the light incidence surface 10A of the light guide plate 10 and intersects with the surface of the transparent substrate 31 or 37 at an angle θ2 (for example, 90°) larger than the angle θ1. That is, when voltage is applied between the lower and upper electrodes 32 and 36, the liquid crystal molecule in the fine particle 34B is aligned with a tilt of the angle θ2 or aligned standing at the angle θ2 (=90°) in the plane parallel to the light incidence surface 10A of the light guide plate 10.

Any monomer can be used as the alignable and polymerizable monomer as long as the monomer is optically anisotropic and mixable with the liquid crystal. In particular, a UV-curable low-molecular monomer is preferable in the embodiment. When voltage is not applied, a direction of optical anisotropy of the liquid crystal preferably corresponds to that of a polymerization product (polymer material) of the low-molecular monomer. Therefore, the liquid crystal and the low-molecular monomer are preferably aligned in the same direction before UV curing. In the case of using a liquid crystal for the fine particle 34B, when the liquid crystal includes rod-like molecules, a rod-like monomer material is preferably used. According to the above, a polymerizable and liquid-crystalline material is preferably used for the monomer material, and, for example, the material preferably has a polymerizable functional group being one or more functional group selected from functional groups including an acrylate group, a methacrylate group, an acryloyloxy group, a methacryloyloxy group, a vinyl ether group, and an epoxy group. The functional groups may be polymerized by being irradiated with ultraviolet rays, infrared rays or an electron beam or by heating. A liquid crystalline material having a multifunctional group may be added to suppress reduction in alignment during UV irradiation. When the bulk 34A includes the striped structure, a bifunctional liquid-crystalline monomer is preferably used as a material of the bulk 34A. A monofunctional monomer may be added to a material of the bulk 34A in order to adjust liquid-crystallinity-exhibiting temperature, or a monomer having a functionality of 3 or higher may be added to the material in order to increase crosslink density.

Although it is not easy to directly measure the refractive indexes of the bulk 34A and the fine particle 34B contained in the light modulation element 30, the values equal to the refractive indexes of the bulk 34A and the fine particle 34B are obtained by the following method, for example. The bulk 34A is formed of a polymer material obtained by polymerizing a low-molecular monomer. The fine particle 34B contains mainly a liquid crystal material. Note that the values equal to the refractive indexes of the bulk 64A and the fine particle 64B in the second embodiment are also obtained by the same method.

Derivation of Refractive Index of the Bulk 34a

First, a horizontal alignment film is applied on a glass substrate, and rubbing is performed in a predetermined direction, thereby forming one transparent substrate. Subsequently, a material in which a predetermined amount of polymerization initiator is added to a liquid crystal monomer that is diluted by a solvent is applied on the transparent substrate. Then, the solvent is dried, and the liquid crystal monomer is polymerized by UV irradiation to form a sample. Next, the sample is placed on the stage so that the rubbing direction intersects at angles of 0 degrees, 45 degrees and 90 degrees with respect to the incident polarization. Each degree is measured by the spectroscopic ellipsometer M-2000U manufactured by J.A. Woollam JAPAN Co., Inc. After that, the refractive index of the sample is obtained by using the fitting software WVASE32 manufactured by J.A. Woollam JAPAN Co., Inc.

Derivation of Refractive Index of the Fine Particle 34b

First, the horizontal alignment film is applied on the glass substrate, and rubbing is performed in a predetermined direction, thereby forming two transparent substrates. The transparent substrates are placed with a certain gap in between to face each other, and the liquid crystal is injected into the gap to form a cell. Next, the cell is placed on the stage so that the rubbing direction intersects at an angle of 45 degrees with respect to the incident polarization. The measurement is conducted by using the above-mentioned spectroscopic ellipsometer M-2000U, and then the refractive index of the cell is obtained by using the above-mentioned fitting software WVASE32.

The driver circuit 50 controls magnitude of voltage applied to a pair of electrodes (lower electrode 32 and upper electrode 36) of each light modulation cell 30-1 such that, for example, the optical axis AX2 of the fine particle 34B is parallel or approximately parallel to the optical axis AX1 of the bulk 34A in a light modulation cell 30-1, and the optical axis AX2 of the fine particle 34B intersects with or is orthogonal to the optical axis AX1 of the bulk 34A in another light modulation cell 30-1. That is, the driver circuit 50 may control directions of the light axes AX1 of the bulk 34A and the optical axis AX2 of the fine particle 34B to be equal (or approximately equal) to or different from (or orthogonal to) each other.

Hereinafter, a method of manufacturing the light modulation element 30 having a configuration common to embodiments of the invention is described with reference to FIGS. 15A to 17C.

Figure 15A:
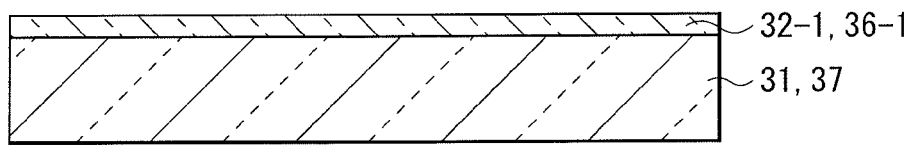
FIGS. 15A to 15C are section diagrams illustrating manufacturing steps of the backlight of FIG. 1A.
Figure 15B:
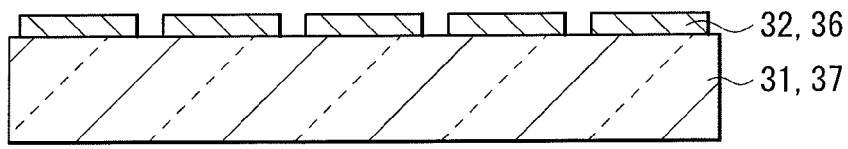

First, a transparent conductive film 32-1 or 36-1 such as ITO films is formed on the transparent substrate 31 or 37 including glass or a plastic film (FIG. 15A). Next, a resist layer is formed on the whole surface of the conductive film, and then an electrode pattern (lower electrode 32 or upper electrode 36) is formed in the resist layer by patterning (FIG. 15B).

As a patterning method, for example, a photolithography method, a laser processing method, a pattern printing method or a screen printing method may be used. For example, the electrode may be patterned by screen printing using Merck's "HiperEtch" material followed by predetermined heating and rinsing. An electrode pattern is determined by a drive method and partition number for partial drive. For example, when a 42-inch display is divided into 12×6, the electrode pattern is formed with an electrode span being approximately 80 mm and a slit portion between electrodes being as thin as possible. However, an excessively thin slit portion is substantially not useful in the light of a blur characteristic described later. Therefore, specifically, a slit of approximately 10 μm to 50 μm is preferable. Alternatively, the electrode pattern may be formed by pattern-printing ITO nano particles and then baking the particles.

Figure 15C:
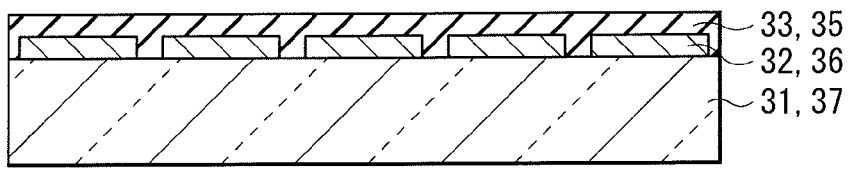

Next, each of the alignment film 33 and 35 is coated on the whole surface, and then the coated film is dried and baked (FIG. 15C). When a polyimide-series material is used for the alignment films 33 and 35, NMP (N-methyl-2-pylorydon) is often used. In such a case, approximately 200° C. is necessary for baking in atmosphere. In this case, when a plastic substrate is used for the transparent substrates 31 and 37, the alignment films 33 and 35 may be vacuum-dried and baked at 100° C. Then, rubbing treatment is performed to the alignment films 33 and 35. Consequently, the alignment films 33 and 35 act as alignment films for horizontal alignment, and furthermore, pre-tilt may be formed in a rubbing direction of each of the alignment films 33 and 35.

Figure 16A:
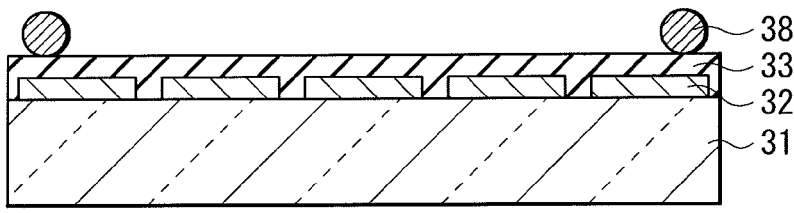
FIGS. 16A to 16C are section diagrams illustrating manufacturing steps following FIG. 15C.

Next, spacers 38 are sprayed on the alignment film 33 by a dry or wet process in order to form a cell gap (FIG. 16A). When the light modulation cell 30-1 is formed by a vacuum bonding method, the spacers 38 may be beforehand mixed in a mixture to be dropped. Columnar spacers may be formed by a photolithography method in place of the spacers 38.

Figure 16B:
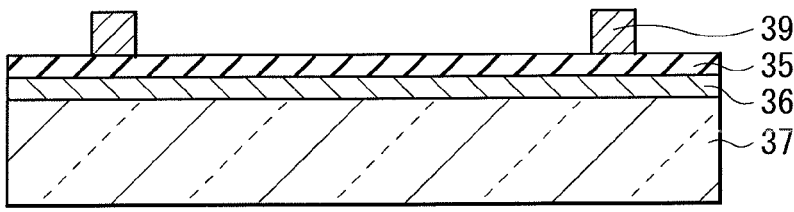

Next, a sealing agent pattern 39 for bonding is formed by coating on the alignment film 35, for example, in a frame pattern so as to prevent leakage of a liquid crystal (FIG. 16B). The sealing agent pattern 39 may be formed by a dispenser method or a screen printing method.

While a vacuum bonding method (One Drop Fill method, or ODF method) is described below, the light modulation cell 30-1 may be formed by a vacuum injection method or a roll bonding method.

Figure 16C:
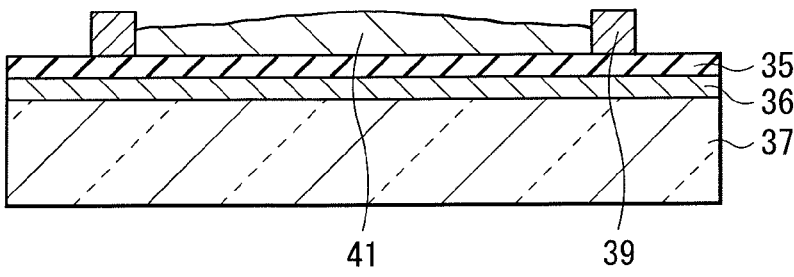

First, a mixture 41 of a liquid crystal and a monomer, having a volume corresponding to the volume determined by a cell gap and cell area, is uniformly dropped in a plane (FIG. 16C). The mixture 41 is preferably dropped by a linear-guide-type precision dispenser. However, the mixture 41 may be dropped by a die coater with a sealing agent pattern 39 as a bank.

The above materials may be used for the liquid crystal and the monomer while a weight ratio of the liquid crystal to the monomer is 98:2 to 50:50, preferably 95:5 to 75:25, and more preferably 92:8 to 85:15. Drive voltage may be reduced by increasing a ratio of the liquid crystal. However, if the liquid crystal is excessively increased, whiteness may be reduced during voltage application, or a cell tends to be hardly returned to a transparent state due to reduction in response speed after voltage application is stopped. A texture size of the striped structure of the bulk 34A formed in a later step may be appropriately adjusted by changing a ratio of the liquid crystal to the monomer within the above range. Increase in percentage of the liquid crystal tends to increase the texture size. Conversely, decrease in percentage of the liquid crystal tends to reduce the texture size. The texture size tends to be reduced with increase in added amount of an initiator material or with increase in ultraviolet illumination.

A polymerization initiator is added to the mixture 41 in addition to the liquid crystal and the monomer. A ratio of the polymerization initiator to be added to the monomer is adjusted within a range of 0.1 percent by weight to 10 percent by weight both inclusive depending on a UV wavelength to be used. In addition, a polymerization inhibitor, a plasticizer, a viscosity adjustor or the like may be added to the mixture 41 as necessary. When the monomer is in a solid or gel state at room temperature, a cap, a syringe, and a substrate are preferably warmed.

Figure 17A:
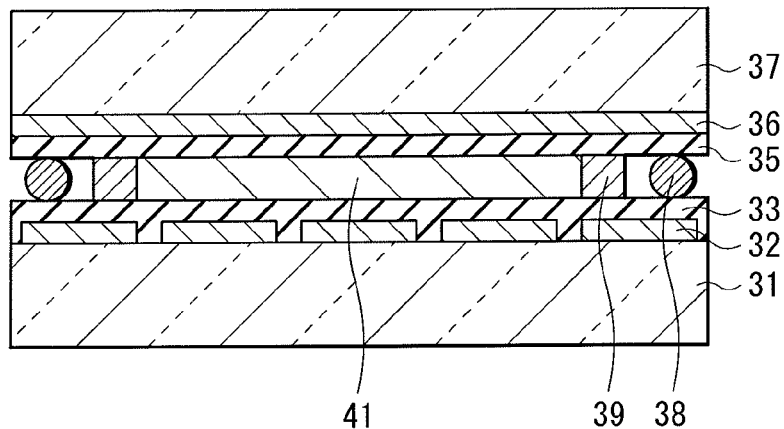
FIGS. 17A to 17C are section diagrams illustrating manufacturing steps following FIG. 16C.

The transparent substrates 31 and 37 are set in a vacuum bonder (not shown), and then the vacuum bonder is evacuated for bonding (FIG. 17A). Then, the bonded cell is released to the atmosphere and then uniformly pressurized at atmospheric pressure so that a cell gap is made uniform. The cell gap, which may be appropriately selected based on a relationship between white luminance (whiteness) and drive voltage, is 5 μm to 40 μm both inclusive, preferably 6 μm to 20 μm both inclusive, and more preferably 7 μm to 10 μm both inclusive.

Figure 17B:
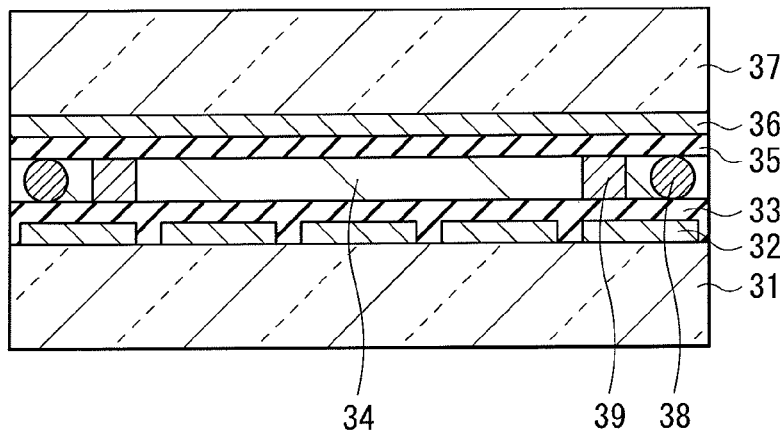

After bonding, alignment treatment is preferably performed as necessary (not shown). When the bonded cell is inserted between crossed nicol polarizers, if light leakage occurs, the cell is heated for a certain time or left to stand at room temperature for alignment. Then, the cell is irradiated with ultraviolet rays L3 to polymerize the monomer into a polymer (FIG. 17B). In this way, the light modulation element 30 is manufactured.

When the cell is irradiated with ultraviolet rays, temperature of the cell is preferably controlled not to be changed. For irradiation of ultraviolet rays, apparatus is preferably prepared to cool the transparent substrate 31 or 37 so that the transparent substrate 31 or 37 is cooled by the apparatus while being irradiated with ultraviolet rays. In such a case, polymerization temperature of a polymer is decreased to, for example, room temperature or lower, so that order parameter of the liquid crystal may be reduced, and therefore disturbance of alignment is prevented, leading to reduction in wavelength dependence of scattering in a dark state. Impurities in the monomer are preferably beforehand removed. This prevents disturbance of alignment, leading to reduction in wavelength dependence of scattering in a dark state.

Use of an infrared cut filter or use of UV-LED as a light source is preferable. In the light of influence on a structure of a composite material, ultraviolet illumination is preferably appropriately adjusted depending on the liquid crystal material or monomer material to be used or compositions of the materials, and is preferably within a range of 0.1 to 500 mW/cm$^2$ both inclusive, and more preferably 0.5 to 30 mW/cm$^2$ both inclusive. As ultraviolet illumination is lower, drive voltage tends to be lower, and therefore ultraviolet illumination may be preferably selected in the light of both productivity and properties. Size of a structure of a composite material may be adjusted by adjusting UV irradiance. For example, when UV irradiance is increased, grain size is reduced, leading to increase in wavelength dependence of scattering.

Figure 17C:
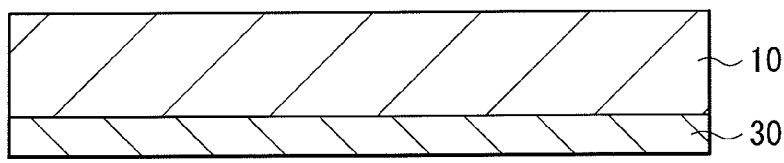

Then, the light modulation element 3 is attached to the light guide plate 10 (FIG. 17C). The element 30 may be attached by either of adhesion and bonding, and is preferably adhered or bonded with a material having a refractive index as similar as possible to that of the light guide plate 10 and to that of a substrate material of the light modulation element 30. Finally, lead lines (not shown) are attached to the lower electrode 32 and the upper electrode 36. In this way, the backlight 1 of the embodiment is manufactured.

While description has been made on a process where the light modulation element 30 is formed and then attached to the light guide plate 10, a transparent substrate 37, having the alignment film 35 formed thereon, may be beforehand attached to a surface of the light guide plate 10 for production of the backlight 1. Moreover, the backlight 1 may be manufactured by either of a sheet-feed method and a roll-to-roll method.

In the case that a transparent conductive film includes ITO, the transparent conductive film is preferably formed, for example, by the following method in order to adjust difference between a maximum value and a minimum value of light absorptivity to be 0.5 or less within a wavelength range of a light source to be used. Hereinafter, description is made on a case where a resin substrate is used as a substrate for forming the transparent conductive film.

First, a transparent conductive film including ITO is deposited on a resin substrate by, for example, a sputtering method. Here, physical thickness d of the transparent conductive film satisfies 1 nm<d<250 nm, and preferably satisfies 10 nm<d<30 nm. Next, the transparent conductive film is annealed at a temperature lower than the glass transition temperature of the resin substrate. For example, in the case that the resin substrate includes ZEONOR, the transparent conductive film is annealed at 120° C. for 1 hour in atmosphere. This results in crystallization of the transparent conductive film on the resin substrate. Here, a resistance value of the crystallized transparent conductive film is 50 to 10,000 ohms per square.

Figure 18:
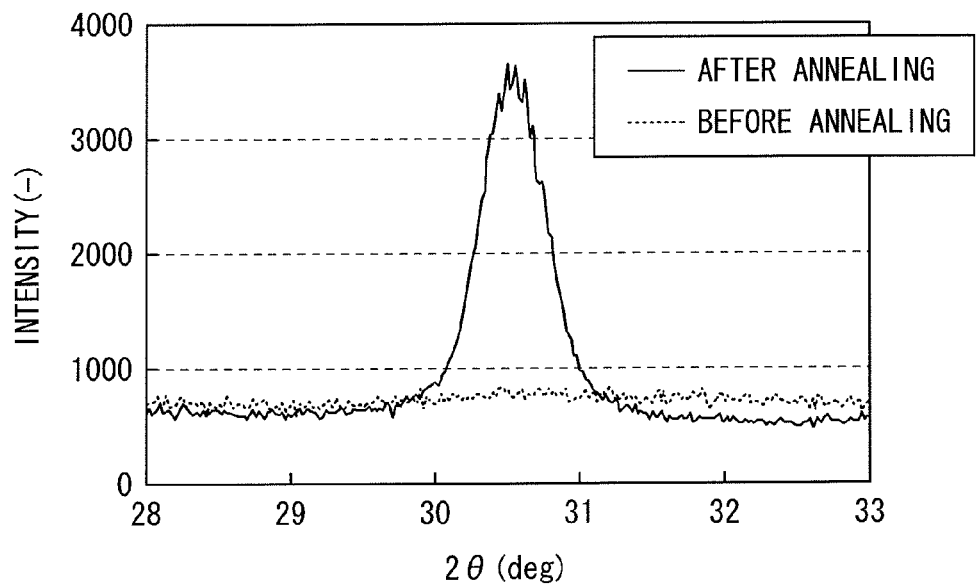
FIG. 18 is an XRD chart obtained by X-ray diffraction measurement.

FIG. 18 shows an XRD chart obtained by X-ray diffraction (XRD) measurement. The XRD measurement was conducted by using "Rad-II C" manufactured by Rigaku Corporation. For the light source, Cu—Kα ray (wavelength is 1.541 Angstrom) was used, and the power of light source was set to 40 kV and 40 mA. As the optical system, the divergence slit of 1°, the scattered slit of 1° and the receiving slit of 0.15 mm were employed. In the figure, a solid line shows an XRD chart of a transparent conductive film that has been crystallized in the above way, and a broken line shows an XRD chart of a transparent conductive film before crystallization. FIG. 18 reveals that the transparent conductive film crystallized in the above way has a peak of a (222) face in the XRD chart. Here, half-value width of the peak is preferably within a range of 0.03° to 2° both inclusive, and more preferably within a range of 0.1° to 0.7° both inclusive. The peak appears at a certain point, while no peak is measured at the point in the transparent conductive film before crystallization.

Figure 19:
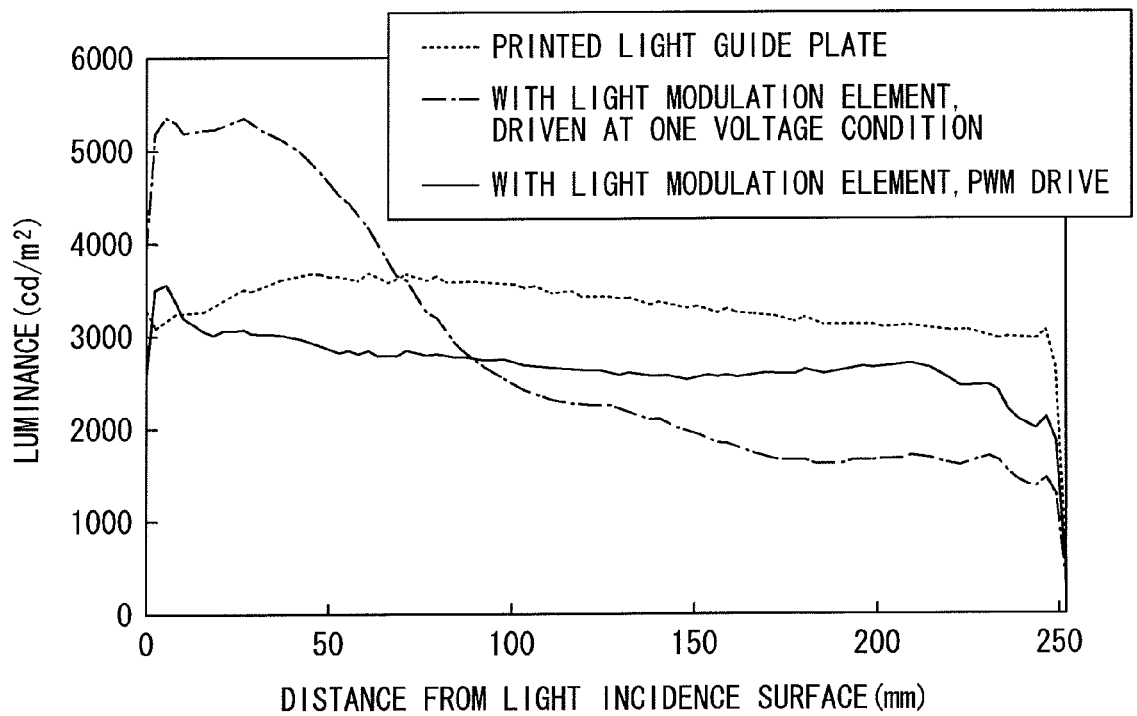
FIG. 19 is a graph showing an example of position dependence of luminance change of backlight.

FIG. 19 shows an example of position dependence of luminance variation of backlight. In the figure, a broken line shows a result in the case that the light modulation element 30 is not provided, and a printed light guide plate is provided as the light guide plate 10. In the figure, a dashed line and a solid line show results of a backlight where the lower electrode 32 and the upper electrode 36 include the transparent conductive film crystallized in the above way, and the lower electrode 32 includes three partial electrodes 32A. In the figure, a dashed line shows a result in the case that one voltage (specifically, 140 Vpp) is applied between a pair of electrodes (lower electrode 32 and upper electrode 36) of each light modulation cell 30-1. In the figure, a solid line shows a result in the case that each light modulation cell 30-1 is applied with a voltage having a duty ratio in correspondence to a distance from the light source 20. Here, voltage amplitude is adjusted to be constant. Specifically, a solid line in the figure shows a result in the case that a voltage of 140 Vpp is applied to a light modulation cell 30-1 nearest the light source 20 with a duty ratio of 28%, to a middle light modulation cell 30-1 with a duty ratio of 45%, and to a light modulation cell 30-1 most away from the light source 20 with a duty ratio of 100%.

FIG. 19 reveals that when cells are driven at the same voltage condition (dashed line in the figure), about 85% luminance is obtained compared with a case where only the printed light guide plate is provided (broken line in the figure). Moreover, FIG. 19 reveals that even if PWM drive is performed (solid line in the figure), about 80% luminance is obtained compared with a case where only the printed light guide plate is provided (broken line in the figure). The same experiment as above is performed with the lower electrode 32 and the upper electrode 36 each including a non-crystalline transparent conductive film. As a result, when cells are driven at the same voltage condition, only about 54% luminance is obtained compared with a case where only the printed light guide plate is provided, and when PWM drive is performed, only about 44% luminance is obtained compared with the case of the printed light guide plate only. These reveal that when the lower electrode 32 and the upper electrode 36 include a crystallized transparent conductive film each, light extraction efficiency is extremely increased compared with a case where the lower electrode 32 and the upper electrode 36 each include a non-crystalline transparent conductive film.

Next, operation and effects of the backlight 1 will be described.

In the backlight 1, for example, voltage is applied to a pair of electrodes (lower electrode 32 and upper electrode 36) of each light modulation cell 30-1 such that the optical axis AX2 of the fine particle 34B is parallel or approximately parallel to the optical axis AX1 of the bulk 34A in a light modulation cell 30-1, and the optical axis AX2 of the fine particle 34B intersects with or is orthogonal to the optical axis AX1 of the bulk 34A in another light modulation cell 30-1. According to this, light, which is emitted from the light source 20 and then enters the light guide plate 10, is transmitted by the transparent region 30A, where the optical axis AX1 is parallel or approximately parallel to the optical axis AX2, of the light modulation element 30. On the other hand, light, which is emitted from the light source 20 and then enters the light guide plate 10, is scattered by the scattering region 30B, where the optical axis AX1 intersects with or is orthogonal to the optical axis AX2, of the light modulation element 30. Among the scattered light, certain light passes through a bottom of the scattering region 30B, and is reflected by the reflective plate 40 and returned to the light guide plate 10, and then outputted from a top of the backlight 1. Among the scattered light, certain light goes to a top of the scattering region 30B, and is transmitted by the light guide plate 10, and then outputted from the top of the backlight 1. In this way, in this basic configuration, light is hardly outputted from a top of the transparent region 30A, and is largely outputted from the top of the scattering region 30B. In this way, a modulation ratio is increased in a front direction.

In the backlight 1, since the bulk 34A and the fine particle 34B mainly include optically anisotropic materials, scattering is small and thus transparency may be improved in an oblique direction. For example, when the bulk 34A and the fine particle 34B mainly include optically anisotropic materials being equal in ordinary refractive index and in extraordinary refractive index, directions of respective light axes of the bulk 34A and the fine particle 34B are equal or approximately equal in a region where voltage is not applied between the lower and upper electrodes 32 and 36. According to this, refractive-index difference is reduced or eliminated in all directions including a front direction (normal direction of the light modulation element 30) and an oblique direction, leading to high transparency. As a result, light leakage may be reduced or substantially eliminated over a wide view angle range, leading to improvement in view angle characteristic.

For example, when a liquid crystal having an ordinary refractive index of 1.5 and an extraordinary refractive index of 1.65 and a liquid-crystalline monomer having an ordinary refractive index of 1.5 and an extraordinary refractive index of 1.65 are mixed, and the liquid-crystalline monomer is polymerized while the liquid crystal and the liquid-crystalline monomer are aligned by an alignment film or by an electric field, an optical axis of the liquid crystal corresponds to an optical axis of a polymer formed through polymerization of the liquid-crystalline monomer. According to this, refractive indexes may be made equal in any direction between the liquid crystal and the polymer. In such a case, a highly transparent state may be achieved, leading to further improvement in view angle characteristic.

In the backlight 1, for example, as shown in FIGS. 10A and 10B, luminance in the transparent region 30A (luminance of black display) is decreased compared with a case of the printed light guide plate or a scattering state (dashed line in FIG. 10B)). On the other hand, luminance in the scattering region 30B is extremely high compared with a case of the printed light guide plate (dashed line in FIG. 10B), and besides luminance of partial white display (luminance enhancement) is increased in correspondence to decrease in luminance in the transparent region 30A.

The luminance enhancement means a technique to increase luminance in partial white display compared with full-screen white display. The technique is generally used in CRT or PDP. However, in a liquid crystal display, since a backlight uniformly emits light over the whole area regardless of an image, luminance may not be partially increased. When an LED backlight including a plurality of LEDs arranged two-dimensionally is used as the backlight, the LEDs may be partially unlit. However, in such a case, since light is not diffused from a dark region of the unlit LEDs, luminance is decreased compared with a case of lighting all LEDs. Luminance may be increased by increasing the amount of current to the LEDs being partially lit. However, in such a case, since large current flows within an extremely short time, a difficulty still remains in a circuit load or in reliability.

In the backlight 1, since the bulk 34A and the fine particle 34B mainly include optically anisotropic materials, scattering is suppressed in an oblique direction, and consequently light leakage from the light guide plate is small in a dark state. Accordingly, since light is guided from a partially dark portion to a partially light portion, luminance enhancement may be achieved without increasing input power to the backlight 1.

In the backlight 1, the optical axis AX2 of the fine particle 34B is parallel to the light incidence surface 10A of the light guide plate 10, and intersects with the surface of the transparent substrate 31 or 37 at a slight angle $\theta 1$ in a region where voltage is not applied between the lower and upper electrodes 32 and 36. That is, liquid crystal molecules in the fine particle 34B are aligned with a tilt of the angle $\theta 1$ (with a pre-tilt angle) in a plane parallel to the light incidence surface 10A. Therefore, when voltage is applied between the lower and upper electrodes 32 and 36, the liquid crystal material in the fine particle 34B rises up in the plane parallel to the light incidence surface 10A instead of rising up in a random direction. Here, the optical axis AX1 of the bulk 34A intersects with or is orthogonal to the optical axis AX2 of the fine particle 34B in the plane parallel to the light incidence surface 10A. Here, among light entering through the light incidence surface 10A of the light guide plate 10, light oscillating perpendicularly to the transparent substrate 31 is affected by difference between an extraordinary refractive index of the fine particle 34B and an ordinary refractive index of the bulk 34A. The difference between the extraordinary refractive index of the fine particle 34B and the ordinary refractive index of the bulk 34A is large, leading to increase in scattering efficiency of light oscillating perpendicularly to the transparent substrate 31. In contrast, light oscillating parallel to the transparent substrate 31 is affected by difference between an ordinary refractive index of the fine particle 34B and an extraordinary refractive index of the bulk 34A. The difference between the ordinary refractive index of the fine particle 34B and the extraordinary refractive index of the bulk 34A is also large, leading to increase in scattering efficiency of light oscillating parallel to the transparent substrate 31. Therefore, light propagating in a region, where voltage is applied between the lower and upper electrodes 32 and 36, contains a large amount of oblique components. For example, when an acrylic light guide plate is used as the light guide plate 10, light propagates at an angle of 41.8° or more in the region where voltage is applied between the lower and upper electrodes 32 and 36. As a result, since refractive-index difference becomes large in all directions including an oblique direction, a high scattering property is obtained, and therefore display luminance may be improved. In addition, display luminance may be more improved due to an effect of the luminance enhancement.

In the embodiment, in the case that the bulk 34A has, for example, the striped structure with average striped texture size of 0.05 μm to 10 μm both inclusive in a short axis direction, when light emitted from the light source 20 repeatedly passes through the light modulation element 30 while propagating in the light guide plate 10, balance of light scattering may be kept over the whole visible range. This may reduce increase in long wavelength component of illumination light with increase in distance from the light source 20 attached on an end of the light guide plate 10. As a result, in-plane variation of light intensity distribution of illumination light may be more reduced over the whole visible range.

In the embodiment, in the case that the upper electrode 36 or both of the lower electrode 32 and the upper electrode 36 is formed of a transparent conductive film, when the transparent conductive film satisfies |A1−A2|≦2.00, a long wavelength component may be varied at a lower rate with a distance from the light source 20. As a result, in-plane variation of light intensity distribution of illumination light may be reduced over the whole visible range. When the transparent conductive film satisfies |A1−A2|≦1.00 or satisfies |A1−A2|≦0.5, a long wavelength component may be varied at a still lower rate with a distance from the light source 20. As a result, in-plane variation of light intensity distribution of illumination light may be more reduced over the whole visible range.

In the embodiment, in the case that the upper electrode 36 or both of the lower electrode 32 and the upper electrode 36 is formed of an ITO film, when one or both of the light guide plate 10 and the light modulation element 30 contains a dye or pigment absorbing a large amount of long-wavelength light compared with short-wavelength light, wavelength dependence of absorption of the light modulation element 30 including the ITO film may be suppressed. As a result, in-plane variation of light intensity distribution of illumination light may be more reduced over the whole visible range.

In the embodiment, in the case that the optical multilayer film 38, of which reflectance is low in a short wavelength range compared with in a long wavelength range, is provided on the upper electrode 36, even if the upper electrode 36 or both of the lower electrode 32 and the upper electrode 36 is formed of an ITO film, wavelength dependence of reflection of the light modulation element 30 including the ITO film may be suppressed by an effect of the optical multilayer film 38. As a result, in-plane variation of light intensity distribution of illumination light may be more reduced over the whole visible range.

In the embodiment, in the case that the bulk 34A and the fine particle 34B are in a relationship as expressed by the above-mentioned formulas (1) and (2), when light emitted from the light source 20 repeatedly passes through the bulk 34A and the fine particle 34B in the light modulation element 30 while propagating in the light guide plate 10, wavelength dependence of scattering in a dark state, which varies with a distance from the light source 20, may be suppressed. As a result, in-plane variation of light intensity distribution of illumination light may be more reduced in a dark state over the whole visible range. Further, in the case that the bulk 34A and the fine particle 34B are in a relationship as expressed by the above-mentioned formulas (3) and (4), in-plane variation of light intensity distribution of illumination light may be furthermore reduced in a dark state over the whole visible range.

In the embodiment, in the case that the bulk 34A and the fine particle 34B are in a relationship as expressed by the above-mentioned formulas (5) and (6), when light emitted from the light source 20 repeatedly passes through the bulk 34A and the fine particle 34B in the light modulation element 30 while propagating in the light guide plate 10, wavelength dependence of scattering in a light state, which varies with a distance from the light source 20, may be suppressed. As a result, in-plane variation of light intensity distribution of illumination light may be more reduced in a light state over the whole visible range. Further, in the case that the bulk 34A and the fine particle 34B are in a relationship as expressed by the above-mentioned formulas (7) and (8), in-plane variation of light intensity distribution of illumination light may be furthermore reduced in a light state over the whole visible range.

In the embodiment, when a plurality of measures are used among the above measures to make a long-wavelength component of illumination light to be uniform in a plane, in-plane variation of light intensity distribution of illumination light may be still more reduced over the whole visible range.

2. Second Embodiment

Example of Using Vertical Alignment PDLC

Next, a backlight 2 according to a second embodiment is described. FIG. 20A shows an example of a sectional configuration of the backlight 2 according to the embodiment. FIG. 20B shows an example of a sectional configuration of a light modulation element 60 in the backlight 2 of FIG. 20A. The backlight 2 of the embodiment is different from the backlight 1 of the above embodiment in that a vertical alignment film is used for alignment films 33 and 35, and a light modulation layer 64 is provided in place of the light modulation layer 34 in the above embodiment. Hereinafter, points common to the configuration of the above embodiment are appropriately omitted to be described, and points different from the configuration are mainly described.

As described before, a vertical alignment film is used for the alignment films 33 are 35 in the embodiment. The vertical alignment film is used to form pre-tilt where a bulk 64A and a fine particle 64B described later are aligned obliquely to the transparent substrate 31. For the vertical alignment film, a silane coupling agent, polyvinyl alcohol (PVA), a polyimide-series material, a surfactant or the like may be used. For example, such a material is coated and dried and then subjected to rubbing treatment so as to provide pre-tilt in a rubbing direction. When a plastic film is used for transparent substrates 31 and 37, since firing temperature is preferably as low as possible after the alignment films 33 and 35 are coated on a surface of the transparent substrates 31 and 37 in a manufacturing process, the silane coupling agent is preferably used for the alignment films 33 and 35 since alcohol-based solvents may be used for the agent. Pre-tilt may be provided without rubbing treatment to the alignment films 33 and 35. As a method to achieve this, for example, cells are formed on the alignment films 33 and 35, and the cells are irradiated with ultraviolet rays while being applied with a magnetic field or an oblique electric-field generated by a slit electrode.

In the case of using the vertical alignment film for the alignment films 33 and 35, liquid crystal molecules having negative dielectric anisotropy (so-called negative liquid crystal) are preferably used as liquid crystal molecules in the fine particle 64B.

Next, the light modulation layer 64 of the embodiment will be described. The light modulation layer 64 is, for example, a composite layer including the bulk 64A (fourth region) and a plurality of fine particles 64B (third region) dispersed in the bulk 64A as shown in FIG. 20B. The bulk 64A and the fine particles 64B each have optical anisotropy.

Figure 21A:
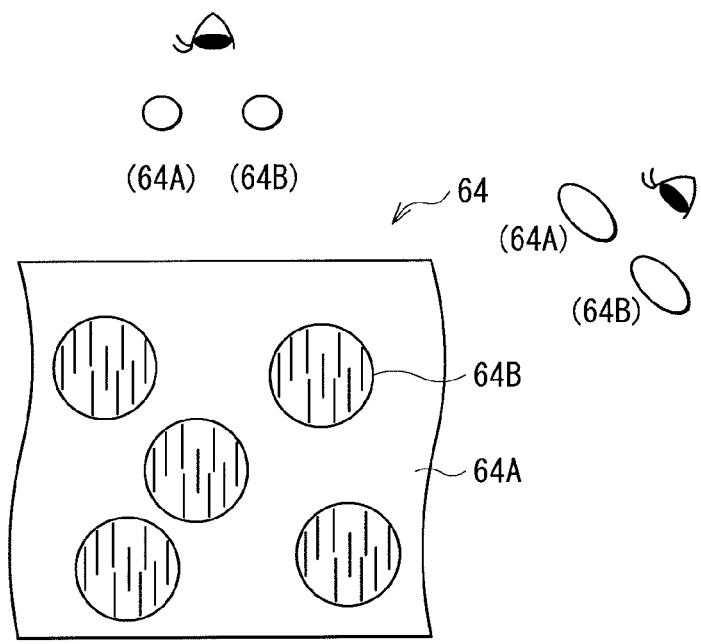
FIGS. 21A to 21C are schematic diagrams illustrating operation of the light modulation element of FIG. 20B.
Figure 21B:
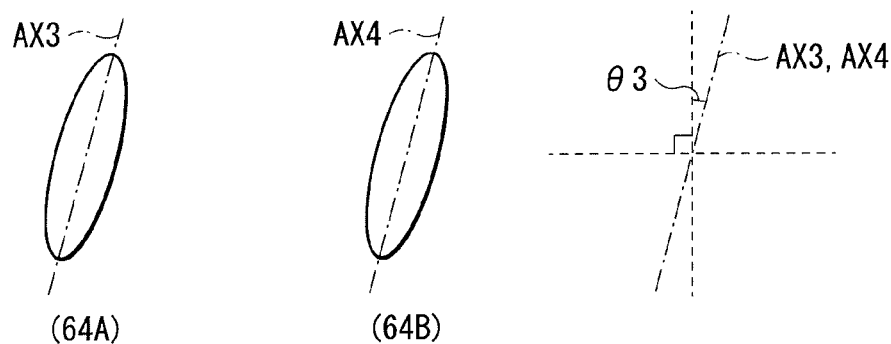
Figure 21C:
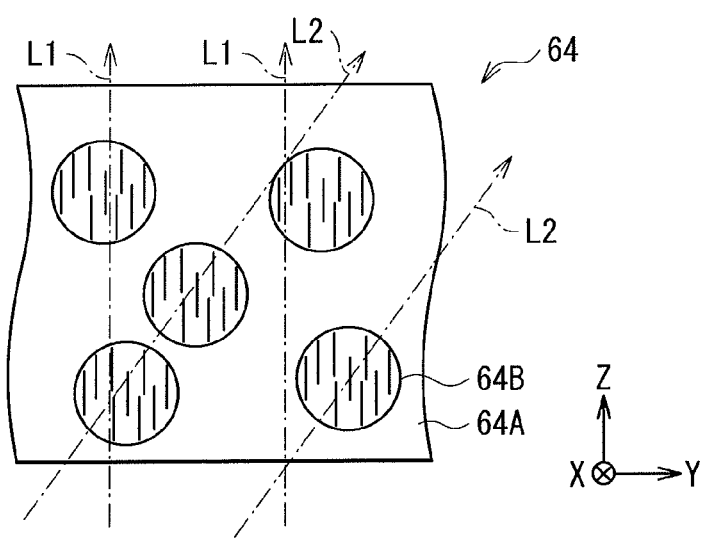

FIG. 21A schematically shows an example of an alignment state in the fine particles 64B in the case that voltage is not applied between the lower and upper electrodes 32 and 36. In FIG. 21A, an alignment state in the bulk 64A is omitted to be shown. FIG. 21B shows an example of an optical indicatrix showing refractive-index anisotropy of each of the bulk 64A and the fine particle 64B in the case that voltage is not applied between the lower and upper electrodes 32 and 36. FIG. 21C schematically shows an example of an aspect where light L1 going in a front direction and light L2 going in an oblique direction are transmitted by the light modulation layer 64 in the case that voltage is not applied between the lower and upper electrodes 32 and 36.

Figure 22A:
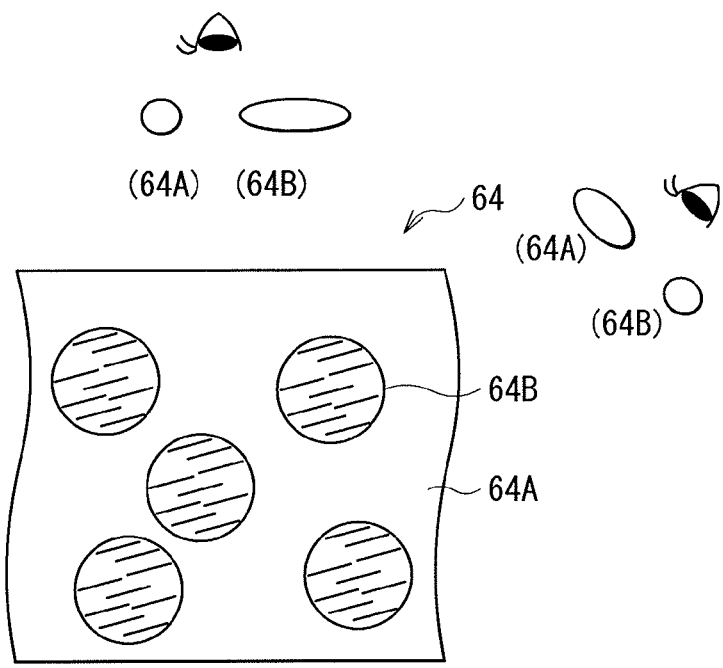
FIGS. 22A to 22C are schematic diagrams illustrating operation of the light modulation element of FIG. 20B.
Figure 22B:
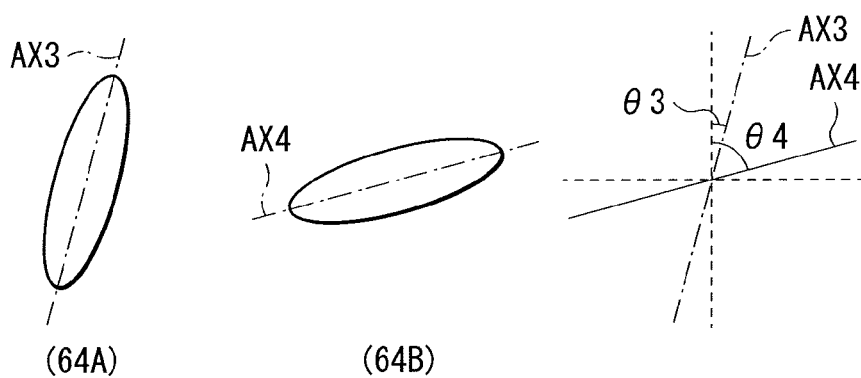
Figure 22C:
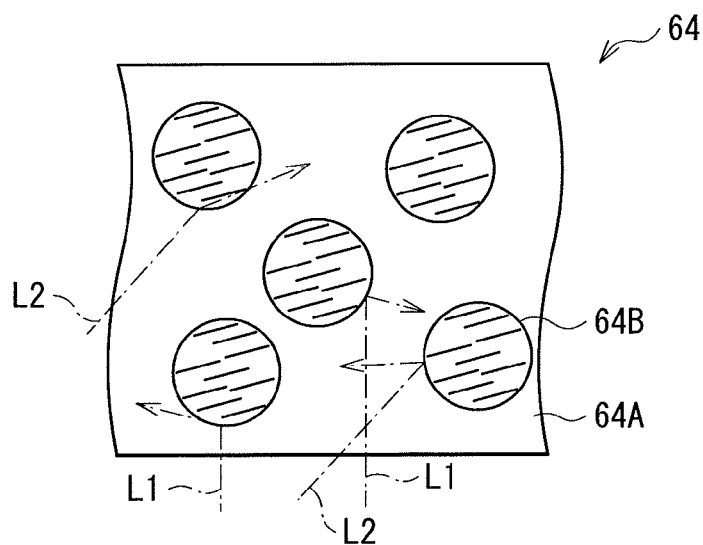

FIG. 22A schematically shows an example of an alignment state in the fine particles 64B in the case that voltage is applied between the lower and upper electrodes 32 and 36. In FIG. 22A, an alignment state in the bulk 64A is omitted to be shown. FIG. 22B shows an example of an optical indicatrix showing refractive-index anisotropy of each of the bulk 64A and the fine particle 64B in the case that voltage is applied between the lower and upper electrodes 32 and 36. FIG. 22C schematically shows an example of an aspect where light L1 going in a front direction and light L2 going in an oblique direction are scattered by the light modulation layer 64 in the case that voltage is applied between the lower and upper electrodes 32 and 36.

The bulk 64A and the fine particle 64B are designed such that when voltage is not applied between the lower and upper electrodes 32 and 36, a direction of an optical axis AX3 of the bulk 64A is equal (parallel) to a direction of an optical axis AX4 of the fine particle 64B, for example, as shown in FIGS. 21A and 21B. The optical axis AX3 or AX4 refers to a line parallel to a forward direction of a beam, where a refractive index has one value regardless of a polarization direction. A direction of the optical axis AX3 and a direction of the optical axis AX4 need not accurately correspond to each other, and may be somewhat different due to, for example, manufacturing errors.

For example, the fine particle 64B is designed such that when voltage is not applied between the lower and upper electrodes 32 and 36, the optical axis AX4 is parallel to a light incidence surface 10A of a light guide plate 10. Furthermore, the fine particle 64B is designed such that when voltage is not applied between the lower and upper electrodes 32 and 36, the optical axis AX4 intersects with a normal of the transparent substrate 31 or 37 at a slight angle θ3 (third angle) (see FIG. 21B). The angle θ3 is described in detail in description of a material forming the fine particle 64B.

For example, the bulk 64A is designed such that the optical axis AX3 of the bulk is constant regardless of presence of voltage applied between the lower and upper electrodes 32 and 36. Specifically, the bulk 64A is designed such that the optical axis AX3 is parallel to the light incidence surface 10A of the light guide plate 10, and intersects with the normal of the transparent substrate 31 or 37 at the slight angle θ3 (third angle), for example, as shown in FIGS. 21A and 21B and FIGS. 22A and 22B. That is, the optical axis AX3 of the bulk 64A is parallel to the optical axis AX4 of the fine particle 64B in the case that voltage is not applied between the lower and upper electrodes 32 and 36.

The optical axis AX4 need not accurately intersect with the normal of the transparent substrate 31 or 37 at the angle θ3 while being parallel to the light incidence surface 10A of the light guide plate 10, and may intersect with the normal at an angle slightly different from the angle θ3 due to, for example, manufacturing errors. In addition, the optical axis AX3 or AX4 need not be accurately parallel to the light incidence surface 10A of the light guide plate 10, and may intersect with the light incidence surface 10A at a slight angle due to, for example, manufacturing errors.

Preferably, an ordinary refractive index of the bulk 64A is equal to an ordinary refractive index of the fine particle 64B, and an extraordinary refractive index of the bulk 64A is also equal to an extraordinary refractive index of the fine particle 64B. In such a case, for example, when voltage is not applied between the lower and upper electrodes 32 and 36, refractive-index difference is substantially zero in all directions including front and oblique directions as shown in FIG. 21A, leading to a high transparent-property. Accordingly, light L1 going in a front direction and light L2 going in an oblique direction are not scattered within the light modulation layer 64 and thus transmitted by the light modulation layer 64, for example, as shown in FIG. 21C. As a result, for example, as shown in FIGS. 10A and 10B, light L from a light source 20 (light in an oblique direction) is completely reflected at a boundary of a transparent region 30A (an interface between the transparent substrate 31 or the light guide plate 10 and air), and therefore luminance in the transparent region 30A (luminance of black display) is decreased compared with a case where the light modulation element 60 is not provided (dashed line in FIG. 10B).

For example, the bulk 64A and the fine particle 64B are designed such that when voltage is applied between the lower and upper electrodes 32 and 36, a direction of the optical axis AX3 is different from (intersects with) a direction of the optical axis AX4 as shown in FIG. 22A. For example, the fine particle 64B is designed such that when voltage is applied between the lower and upper electrodes 32 and 36, the optical axis AX4 of the fine particle 64B is parallel to the light incidence surface 10A of the light guide plate 10, and the optical axis AX4 intersects with the normal of the transparent substrate 31 or 37 at an angle θ4 (fourth angle) larger than the angle θ3 or is parallel to the surface of the transparent substrate 31 or 37. The angle θ4 is described in detail in description of the material forming the fine particle 64B.

Therefore, light propagating in a region, where voltage is applied between the lower and upper electrodes 32 and 36, contains a large number of oblique components. For example, when an acrylic light guide plate is used as the light guide plate 10, light propagates at an angle of 41.8° or more in the region where voltage is applied between the lower and upper electrodes 32 and 36. As a result, refractive-index difference becomes large for light propagating in a region, where voltage is applied between the lower and upper electrodes 32 and 36, leading to a high scattering property. Accordingly, light L1 going in a front direction and light L2 going in an oblique direction are scattered within the light modulation layer 64, for example, as shown in FIG. 22C. As a result, as in the above embodiment, light L (light in an oblique direction) from the light source 20 passes through a boundary (interface between the transparent substrate 31 or the light guide plate 10 and air) of the scattering region 30B, and light transmitted to a reflective plate 40 side is reflected by a reflective plate 40 and then transmitted by the light modulation element 60, for example, as shown in FIGS. 10A and 10B. Therefore, luminance in the scattering region 30B is extremely high compared with a case of a printed light guide plate (dashed line in FIG. 10B), and besides luminance of partial white display (luminance enhancement) is increased in correspondence to decrease in luminance in the transparent region 30A.

The ordinary refractive index of the bulk 64A is preferably equal to the ordinary refractive index of the fine particle 64B, but may be somewhat different from each other due to, for example, manufacturing errors. For example, such difference (refractive index difference $\Delta_{no}$) is preferably 0.1 or less in a visible range (see FIG. 11). Similarly, the extraordinary refractive index of the bulk 64A is preferably equal to the extraordinary refractive index of the fine particle 64B, but may be somewhat different from each other due to, for example, manufacturing errors. For example, such difference (refractive index difference $\Delta_{ne}$) is preferably 0.1 or less in a visible range (see FIG. 11).

Refractive-index difference of the bulk 64A ($\Delta n_p$=extraordinary refractive index $ne_p$–ordinary refractive index $no_p$) or refractive-index difference of the fine particle 64B ($\Delta n_L$=extraordinary refractive index $ne_L$–ordinary refractive index $no_L$) is preferably as large as possible, and is preferably 0.05 or more, more preferably 0.1 or more, and still more preferably 0.15 or more. In addition, difference (refractive-index difference $\Delta(ne_L-no_p)$) between the extraordinary refractive index $ne_L$ of the fine particle 64B and the ordinary refractive index $no_p$ of the bulk 64A is preferably 0.1 or more in a visible range, and difference (refractive-index difference $\Delta(ne_p-no_L)$) between the extraordinary refractive index $ne_p$ of the bulk 64A and the ordinary refractive index $no_L$ of the fine particle 64B is preferably 0.1 or more in a visible range. In such cases, scattering ability of the light modulation layer 64 is improved, so that a light guide condition may be easily broken, and consequently light from the light guide plate 10 is easily extracted.

The bulk 64A and the fine particle 64B are preferably in a relationship as expressed by the following formulas (9) and (10), and more preferably in a relationship as expressed by the following formulas (11) and (12) (see FIG. 12).

$$|\Delta ne(450\text{ nm}) - \Delta ne(650\text{ nm})| \leq 0.059 \quad (9)$$

$$|\Delta no(450\text{ nm}) - \Delta no(650\text{ nm})| \leq 0.059 \quad (10)$$

$$|\Delta ne(450\text{ nm}) - \Delta ne(650\text{ nm})| \leq 0.032 \quad (11)$$

$$|\Delta no(450\text{ nm}) - \Delta no(650\text{ nm})| \leq 0.032 \quad (12)$$

$\Delta ne$ (450 nm): $\Delta ne$ at 450 nm
$\Delta ne$ (650 nm): $\Delta ne$ at 650 nm
$\Delta ne = ne_L - ne_p$
$\Delta no$ (450 nm): $\Delta no$ at 450 nm
$\Delta no$ (650 nm): $\Delta no$ at 650 nm
$\Delta no = no_L - no_p$ Moreover, the bulk 64A and the fine particle 64B are preferably in a relationship as expressed by the following formulas (13) and (14), and more preferably in a relationship as expressed by the following formulas (15) and (16) (see FIG. 13).

$$|\Delta(ne_L-no_p)(450\text{ nm}) - \Delta(ne_L-no_p)(650\text{ nm})| \leq 0.080 \quad (13)$$

$$|\Delta(ne_p-no_L)(450\text{ nm}) - \Delta(ne_p-no_L)(650\text{ nm})| \leq 0.080 \quad (14)$$

$$|\Delta(ne_L-no_p)(450\text{ nm}) - \Delta(ne_L-no_p)(650\text{ nm})| \leq 0.044 \quad (15)$$

$$|\Delta(ne_p-no_L)(450\text{ nm}) - \Delta(ne_p-no_L)(650\text{ nm})| \leq 0.044 \quad (16)$$

$\Delta(ne_L-no_p)$ (450 nm): $ne_L-no_p$ at 450 nm
$\Delta(ne_L-no_p)$ (650 nm): $ne_L-no_p$ at 650 nm
$\Delta ne_L-no_p = ne_L-no_p$
$\Delta(ne_p-no_L)$ (450 nm): $ne_p-no_L$ at 450 nm
$\Delta(ne_p-no_L)$ (650 nm): $ne_p-no_L$ at 650 nm
$\Delta(ne_p-no_L) = ne_p-no_L$ The bulk 64A and the fine particle 64B are different in response speed to an electric field. The bulk 64A has, for example, a striped structure (see FIGS. 14A and 14B) or porous structure unresponsive to an electric field, or a rod-like structure having a slower response speed than that of the fine particle 64B. The bulk 64A is, for example, formed of a polymer material obtained by polymerizing a low-molecular monomer. The bulk 64A is, for example, formed by polymerizing an alignable and polymerizable material (for example, monomer) by one or both of heat and light, the material being aligned along an alignment direction of the fine particle 64B or of the alignment film 33 or 35. When the bulk 64A has, for example, the striped structure, average striped texture size in a short axis direction is preferably 0.05 μm to 10 μm both inclusive from the viewpoint of increasing scattering of guided light, and more preferably 0.2 μm to 7 μm both inclusive. From the viewpoint of reducing wavelength dependence of scattering, the average striped texture size in a short axis direction is preferably 0.5 μm to 5 μm both inclusive, and more preferably 1 μm to 3 μm both inclusive. The reason for these is as described in the above embodiment.

The fine particle 64B mainly includes, for example, a liquid crystal material, and thus has a response speed sufficiently faster than that of the bulk 64A. The liquid crystal material (liquid crystal molecules) in the fine particle 64B includes, for example, rod-like molecules. For example, liquid crystal molecules having negative dielectric anisotropy (so-called negative liquid crystal) are used as the liquid crystal molecules in the fine particle 64B.

When voltage is not applied between the lower and upper electrodes 32 and 36, a long axis direction of each liquid crystal molecule is parallel to the optical axis AX3 in the bulk 64A. Here, the long axis of the liquid crystal molecule in the fine particle 64B is parallel to the light incidence surface 10A of the light guide plate 10 and intersects with the normal of the transparent substrate 31 or 37 at a slight angle θ3. That is, when voltage is not applied between the lower and upper electrodes 32 and 36, the liquid crystal molecule in the fine particle 64B is aligned with a tilt of the angle θ3 in a plane parallel to the light incidence surface 10A of the light guide plate 10. The angle θ3 is called pre-tilt angle, and, for example, preferably within a range of 0.1° to 30° both inclusive. The angle θ3 is more preferably within a range of 0.5° to 10° both inclusive, and still more preferably within a range of 0.7° to 2° both inclusive. When the angle θ3 is increased, scattering efficiency tends to be reduced due to a reason described later. On the other hand, an excessively small angle θ3 causes variation in an azimuth, at which a liquid crystal falls down upon voltage application. For example, a liquid crystal may fall down in a 180-degree opposite direction (reverse tilt). Accordingly, since refractive-index difference between the fine particle 64B and the bulk 64A may not be effectively used, scattering efficiency is reduced, and therefore luminance tends to be reduced.

When voltage is applied between the lower and upper electrodes 32 and 36, the long axis direction of the liquid crystal molecule intersects with (or is orthogonal to) the optical axis AX3 in the bulk 64A. Here, the long axis of the liquid crystal molecule in the fine particle 64B is parallel to the light incidence surface 10A of the light guide plate 10 and intersects with the normal of the transparent substrate 31 or 37 at an angle θ4 larger than the angle θ3. That is, when voltage is applied between the lower and upper electrodes 32 and 36, the liquid crystal molecule in the fine particle 64B is aligned with a tilt of the angle θ4 or aligned lying at the angle θ4 (=90°) in the plane parallel to the light incidence surface 10A of the light guide plate 10.

Any monomer can be used as the alignable and polymerizable monomer as long as the monomer is optically anisotropic and mixable with the liquid crystal. In particular, a UV-curable low-molecular monomer is preferable in the embodiment. When voltage is not applied, a direction of optical anisotropy of the liquid crystal preferably corresponds to that of a polymerization product (polymer material) of the low-molecular monomer. Therefore, the liquid crystal and the low-molecular monomer are preferably aligned in the same direction before UV curing. In the case of using a liquid crystal for the fine particle 64B, when the liquid crystal includes rod-like molecules, a rod-like monomer material is preferably used. According to the above, a polymerizable and liquid-crystalline material is preferably used for the monomer material, and, for example, the material preferably has a polymerizable functional group being one or more functional group selected from functional groups including an acrylate group, a methacrylate group, an acryloyloxy group, a methacryloyloxy group, a vinyl ether group, and an epoxy group. The functional groups may be polymerized by being irradiated with ultraviolet rays, infrared rays or an electron beam or by heating. A liquid crystalline material having a multifunctional group may be added to suppress reduction in alignment during UV irradiation. When the bulk 64A includes the above-described striped structure, a bifunctional liquid-crystalline monomer is preferably used as a material of the bulk 64A. A monofunctional monomer may be added to a material of the bulk 64A in order to adjust liquid-crystallinity-exhibiting temperature, or a monomer having a functionality of 3 or higher may be added to the material in order to increase crosslink density.

Next, operation and effects of the backlight 2 of the embodiment will be described.

In the backlight 2 of the embodiment, for example, voltage is applied to a pair of electrodes (lower electrode 32 and upper electrode 36) of each light modulation cell 30-1 such that the optical axis AX4 of the fine particle 64B is parallel or approximately parallel to the optical axis AX3 of the bulk 64A in a light modulation cell 30-1, and the optical axis AX4 of the fine particle 64B intersects with or is orthogonal to the optical axis AX3 of the bulk 64A in another light modulation cell 30-1. According to this, light, which is emitted from the light source 20 and then enters the light guide plate 10, is transmitted by the transparent region 30A, where the optical axis AX3 is parallel or approximately parallel to the optical axis AX4, of the light modulation element 60. On the other hand, light, which is emitted from the light source 20 and then enters the light guide plate 10, is scattered by the scattering region 30B, where the optical axis AX3 intersects with or is orthogonal to the optical axis AX4, of the light modulation element 60. Among the scattered light, certain light passes through a bottom of the scattering region 30B and is reflected by the reflective plate 40 and returned to the light guide plate 10, and then outputted from a top of the backlight 2. Among the scattered light, certain light goes to a top of the scattering region 30B, and is transmitted by the light guide plate 10, and then outputted from the top of the backlight 2. In this way, in the embodiment, light is hardly outputted from a top of the transparent region 30A, and is largely outputted from the top of the scattering region 30B. In this way, a modulation ratio is increased in a front direction.

In the embodiment, since the bulk 64A and the fine particle 64B mainly include optically anisotropic materials, scattering is small and consequently transparency may be improved in an oblique direction. For example, when the bulk 64A and the fine particle 64B mainly include optically anisotropic materials being equal in ordinary refractive index and in extraordinary refractive index, directions of respective light axes of the bulk and the particle are equal or approximately equal in a region where voltage is not applied between the lower and upper electrodes 32 and 36. According to this, refractive-index difference is reduced or eliminated in all directions including a front direction (normal direction of the light modulation element 60) and an oblique direction, leading to a high transparency. As a result, light leakage may be reduced or substantially eliminated over a wide view angle range, leading to improvement in view angle characteristic.

For example, when a liquid crystal having an ordinary refractive index of 1.5 and an extraordinary refractive index of 1.65 and a liquid-crystalline monomer having an ordinary refractive index of 1.5 and an extraordinary refractive index of 1.65 are mixed, and the liquid-crystalline monomer is polymerized while the liquid crystal and the liquid-crystalline monomer are aligned by an alignment film or by an electric field, an optical axis of the liquid crystal corresponds to an optical axis of a polymer formed through polymerization of the liquid-crystalline monomer. According to this, refractive indexes may be made equal in any direction between the liquid crystal and the polymer. In such a case, a highly transparent state may be achieved, leading to further improvement in view angle characteristic.

In the embodiment, for example, as shown in FIGS. 10A and 10B, luminance in the transparent region 30A (luminance of black display) is decreased compared with a case of the printed light guide plate or a scattering state (dashed line in FIG. 10B)). On the other hand, luminance in the scattering region 30B is extremely high compared with a case of the printed light guide plate (dashed line in FIG. 10B), and besides luminance of partial white display (luminance enhancement) is increased in correspondence to decrease in luminance in the transparent region 30A. This is because the bulk 64A and the fine particle 64B mainly include optically anisotropic materials, and therefore scattering is suppressed in an oblique direction, and consequently light leakage from the light guide plate is small in a dark state. Accordingly, since light is guided from a partially dark portion to a partially light portion, luminance enhancement may be achieved without increasing input power to the backlight 2.

In the embodiment, the optical axis AX4 of the fine particle 64B is parallel to the light incidence surface 10A of the light guide plate 10, and intersects with the normal of the transparent substrate 31 or 37 at a slight angle θ3 in a region where voltage is not applied between the lower and upper electrodes 32 and 36. That is, liquid crystal molecules in the fine particle 64B are aligned with a tilt of the angle θ3 (with a pre-tilt angle) in a plane parallel to the light incidence surface 10A. Therefore, when voltage is applied between the lower and upper electrodes 32 and 36, the liquid crystal material in the fine particle 64B falls down in the plane parallel to the light incidence surface 10A instead of falling down in a random direction. Here, the optical axis AX3 of the bulk 64A intersects with or is orthogonal to the optical axis AX4 of the fine particle 64B in the plane parallel to the light incidence surface 10A. Here, among light entering through the light incidence surface 10A of the light guide plate 10, light oscillating perpendicularly to the transparent substrate 31 is affected by difference between an ordinary refractive index of the fine particle 64B and an extraordinary refractive index of the bulk 64A. The difference between the ordinary refractive index of the fine particle 64B and the extraordinary refractive index of the bulk 64A is large, leading to increase in scattering efficiency of light oscillating perpendicularly to the transparent substrate 31. In contrast, light oscillating parallel to the transparent substrate 31 is affected by difference between an extraordinary refractive index of the fine particle 64B and an ordinary refractive index of the bulk 64A. The difference between the extraordinary refractive index of the fine particle 64B and the ordinary refractive index of the bulk 64A is also large, leading to increase in scattering efficiency of light oscillating parallel to the transparent substrate 31. Therefore, light propagating in a region, where voltage is applied between the lower and upper electrodes 32 and 36, contains a large amount of oblique components. For example, when an acrylic light guide plate is used as the light guide plate 10, light propagates at an angle of 41.8° or more in the region where voltage is applied between the lower and upper electrodes 32 and 36. As a result, since refractive-index difference becomes large, a high scattering property is obtained, and therefore display luminance may be improved. In addition, display luminance may be more improved due to an effect of the luminance enhancement.

For example, when the respective light axes AX3 and AX4 of the bulk 64A and the fine particle 64B are set perpendicularly to the light incidence surface 10A of the light guide plate 10 during no voltage application, while light oscillating perpendicularly to the transparent substrate 31 is affected by difference between the ordinary refractive index of the fine particle 64B and the extraordinary refractive index of the bulk 64A as in the above case, light oscillating parallel to the transparent substrate 31 is affected by difference between the ordinary refractive index of the fine particle 64B and the ordinary refractive index of the bulk 64A. Here, the difference between the ordinary refractive index of the fine particle 64B and the ordinary refractive index of the bulk 64A is almost zero or completely zero. Therefore, among light entering through the light incidence surface 10A, while light oscillating perpendicularly to the transparent substrate 31 is affected by large refractive-index difference as in the above case, light oscillating parallel to the transparent substrate 31 is hardly or not affected by refractive-index difference. As a result, while scattering efficiency of light oscillating perpendicularly to the transparent substrate 31 is high, scattering efficiency of light oscillating parallel to the transparent substrate 31 is low or zero. Therefore, when the light axes AX3 and AX4 are set perpendicularly to the light incidence surface 10A, scattering efficiency is low compared with the case where the light axes AX3 and AX4 are set parallel to the light incidence surface 10A, and therefore luminance of light extracted from the light guide plate 10 is reduced.

When pre-tilt is not formed, or a pre-tilt angle is substantially 90°, an azimuth, at which a liquid crystal falls down, is random, and therefore refractive-index difference corresponds to an average between refractive-index difference in the case that the respective light axes AX3 and AX4 of the bulk 64A and the fine particle 64B are set parallel to the light incidence surface 10A of the light guide plate 10, and refractive-index difference in the case that the light axes are set perpendicularly to the surface 10A. Therefore, even in such a case, luminance of extracted light is reduced compared with a case where the light axes AX3 and AX4 of the bulk 64A and the fine particle 64B are set parallel to the light incidence surface 10A of the light guide plate 10.

In the embodiment, in the case that the bulk 64A has, for example, the above-mentioned striped structure with average striped texture size of 0.05 μm to 10 μm both inclusive in a short axis direction, when light emitted from the light source 20 repeatedly passes through the light modulation element 60 while propagating in the light guide plate 10, balance of light scattering may be kept over the whole visible range. This may reduce increase in long wavelength component of illumination light with increase in distance from the light source 20 attached on an end of the light guide plate 10. As a result, in-plane variation of light intensity distribution of illumination light may be more reduced over the whole visible range.

In the embodiment, in the case that the bulk 64A and the fine particle 64B are in a relationship as expressed by the above-mentioned formulas (9) and (10), when light emitted from the light source 20 repeatedly passes through the bulk 64A and the fine particle 64B in the light modulation element 60 while propagating in the light guide plate 10, wavelength dependence of scattering in a dark state, which varies with a distance from the light source 20, may be suppressed. As a result, in-plane variation of light intensity distribution of illumination light may be more reduced in a dark state over the whole visible range. Further, in the case that the bulk 64A and the fine particle 64B are in a relationship as expressed by the above-mentioned formulas (11) and (12), in-plane variation of light intensity distribution of illumination light may be further more reduced in a dark state over the whole visible range.

In the embodiment, in the case that the bulk 64A and the fine particle 64B are in a relationship as expressed by the above-mentioned formulas (13) and (14), when light emitted from the light source 20 repeatedly passes through the bulk 64A and the fine particle 64B in the light modulation element 60 while propagating in the light guide plate 10, wavelength dependence of scattering in a light state, which varies with a distance from the light source 20, may be suppressed. As a result, in-plane variation of light intensity distribution of illumination light may be more reduced in a light state over the whole visible range. Further, in the case that the bulk 64A and the fine particle 64B are in a relationship as expressed by the above-mentioned formulas (15) and (16), n-plane variation of light intensity distribution of illumination light may be further more reduced in a light state over the whole visible range.

In the embodiment, when a plurality of measures are used among the above measures to make the long-wavelength component of illumination light to be uniform in a plane, in-plane variation of light intensity distribution of illumination light may be still more reduced over the whole visible range.

3. Modification

Figure 23:
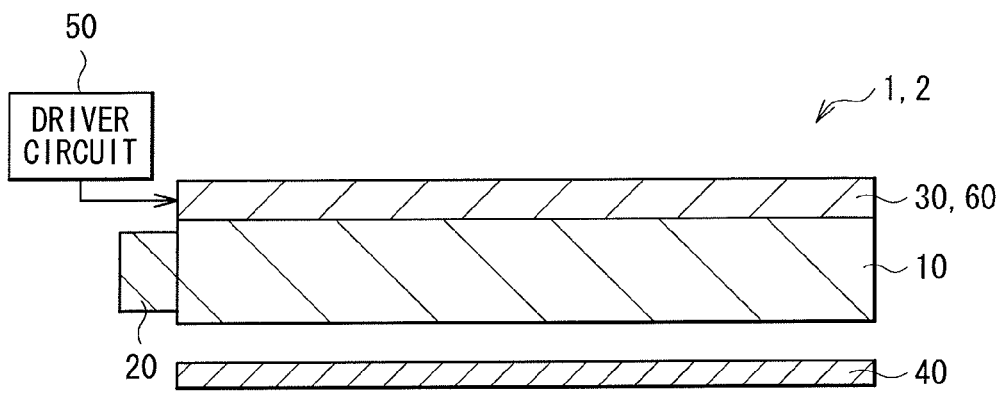
FIG. 23 is a section diagram showing a first modification of the backlight of FIG. 1A or 20A.
Figure 24:
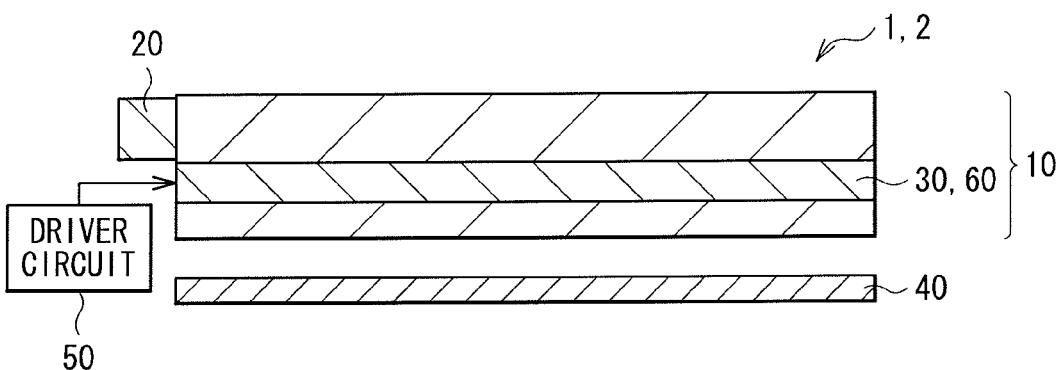
FIG. 24 is a section diagram showing a second modification of the backlight of FIG. 1A or 20A.

In the embodiments, the light modulation elements 30 and 60 are adherently bonded to the back (bottom) of the light guide plate 10 with no air layer in between. However, the element may be adherently bonded to a top of the light guide plate 10 with no air layer in between, for example, as shown in FIG. 23. The light modulation elements 30 and 60 may be provided in the inside of the light guide plate 10, for example, as shown in FIG. 24. Even in such a case, the light modulation elements 30 and 60 need to be adherently bonded to the light guide plate 10 with no air layer in between.

Figure 25:
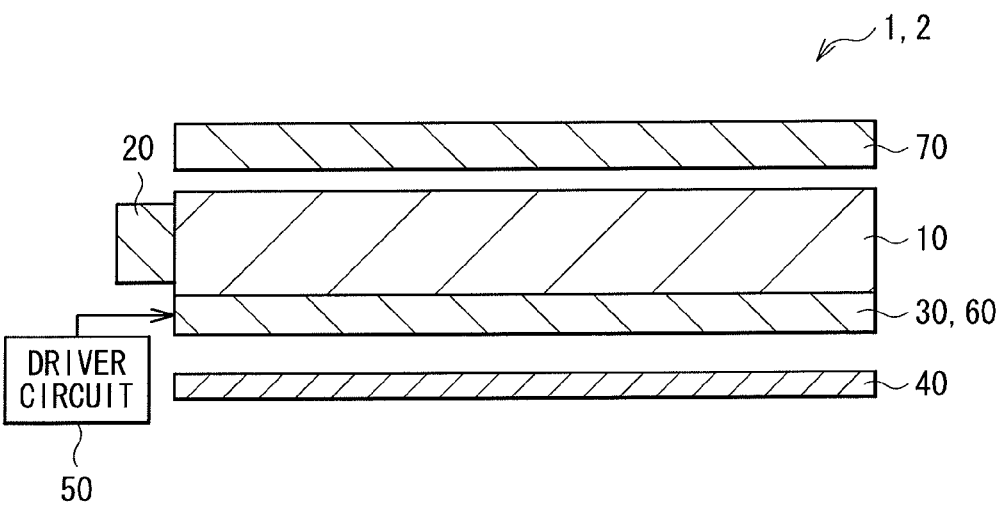
FIG. 25 is a section diagram showing a third modification of the backlight of FIG. 1A or 20A.

While no component is provided on the light guide plate 10 in the embodiments and the modification, an optical sheet 70 (for example, a diffuser plate, a diffuser sheet, a lens film or a polarization separation sheet) may be provided thereon, for example, as shown in FIG. 25. In such a case, since part of light outputted in an oblique direction from the light guide plate 10 is directed to the front, a modulation ratio may be effectively improved.

In the embodiments and the modification, the light modulation elements 30 and 60 are switched between a transparent state and a scattering state depending on presence of voltage application. When scattering grain size of the bulks 34A and 64A are approximately similar to a wavelength of visible light, the element has wavelength dependence of scattering. Similarly, when the light modulation elements 30 and 60 have wavelength dependence of a refractive index, the element has wavelength dependence of scattering. In the edge light type, since a portion away from a light source is influenced by scattering history of a region near the light source, in-plane chromaticity difference tends to be increased due to the wavelength dependence of scattering. Therefore, wavelength dependence of scattering of the light modulation elements 30 and 60 are preferably reduced.

Wavelength dependence of scattering of the light modulation elements 30 and 60 may be calculated by obtaining a ratio of a scattered-light spectrum to a guided-light spectrum at one point in the light modulation elements 30 and 60. The scattered-light spectrum is obtained by measuring, by using a luminance meter, light transmitted by a diffuser sheet and a prism sheet disposed on a top of the backlight 1 or 2 while the light modulation element 30 or 60 is partially adjusted to be in a scattering state. Here, the luminance meter is positioned directly above a portion nearest to the light source 20 in a scattering region to prevent reflection of scattering history in the scattering region. The guided-light spectrum is measured while a light guide condition is intentionally broken by attaching a diffuser sheet on the light modulation element 30 or 60 with matching oil in between. In measurement of the guided-light spectrum, a prism sheet is disposed on the diffuser sheet, and a position of a luminance meter and a configuration of an optical sheet are set in the same way as in measurement of the scattered-light spectrum.

Figure 26:
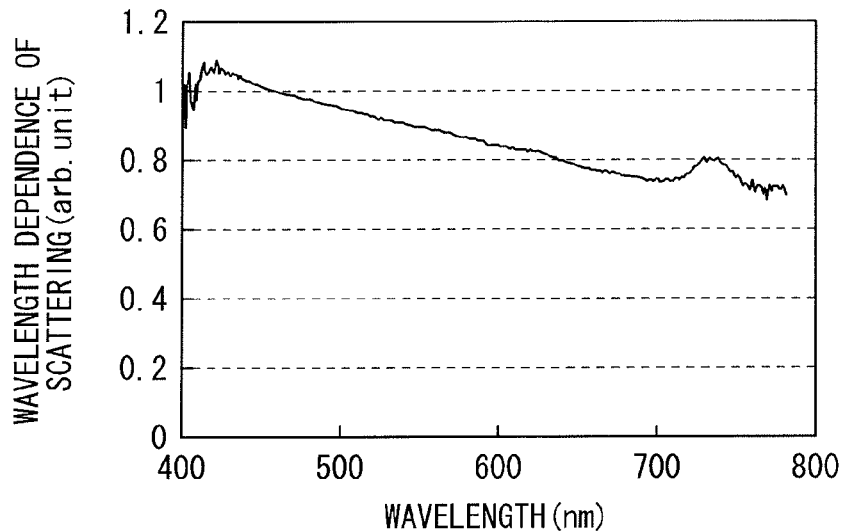
FIG. 26 is a graph showing an example of wavelength dependence of scattering of PDLC having a striped structure.

As generally known, since scattering grain size of PDLC is approximately similar to a wavelength of visible light, and PDLC has wavelength dependence of a refractive index, PDLC has wavelength dependence of scattering. FIG. 26 shows wavelength dependence of scattering of PDLC having a striped structure. Since the PDLC having a striped structure has a large texture, the wavelength dependence of scattering is relatively small. However, ideally, a degree of scattering of visible light is desirably constant for each wavelength.

As a cause of the wavelength dependence of scattering of the PDLC having a striped structure, for example, a liquid crystal and a monomer conceivably have wavelength dependence of a refractive index, respectively. Thus, for example, it is likely that a type of each of a liquid crystal and a monomer, a weight ratio between the liquid crystal and the monomer, a type and amount of polymerization initiator, intensity and a wavelength of ultraviolet rays in polymerization, sample temperature in polymerization and the like are adjusted so that wavelength dependence of a refractive index is reduced. Moreover, for example, it is likely that interfacial contact area between the liquid crystal and the monomer is increased, or refractive-index difference between the liquid crystal and the monomer is increased, thereby scattering efficiency is increased and multiple scattering is thus increased, so that wavelengths to be extracted are equalized, and consequently the wavelength dependence of scattering is reduced. Moreover, for example, it is likely that PDLC is increased in thickness to increase optical path length, so that wavelengths to be extracted are equalized through multiple scattering, thereby wavelength dependence of scattering is reduced.

Hereinafter, detailed description will be made on increase in scattering efficiency through adjustment of a monomer type, and on increasing thickness of PDLC to equalize wavelengths to be extracted through multiple scattering.

First, description is made on increase in scattering efficiency by adjusting a monomer type. PDLC is obtained by polymerizing a monomer in a mixture of a liquid crystal and the monomer. Therefore, scattering efficiency may be adjusted by changing a monomer type. For example, only a bifunctional monomer is used as the monomer, thereby a striped structure is obtained. On the other hand, a bifunctional monomer added with an appropriate amount of multifunctional monomer is used as the monomer, thereby a three-dimensional network structure is formed in a striped texture. The three-dimensional network structure refers to a structure where polymer is somewhat branched even in a direction orthogonal to stripes. The three-dimensional network structure is formed in the striped texture in this way, thereby scattering boundaries are increased and thus wavelength dependence of scattering is expected to be improved due to multiple scattering. However, if an excessively large amount of multifunctional monomer is added to the bifunctional monomer, a striped texture is excessively broken, leading to reduction in scattering efficiency. Therefore, the amount of multifunctional monomer is preferably larger than 0 percent by weight and less than 70 percent by weight of total monomers, and more preferably larger than 5 percent by weight and less than 50 percent by weight. Since an excessively large number of functional groups tend to disturb alignment, a trifunctional monomer is preferable as the multifunctional monomer.

Next, description will be made on increasing thickness of PDLC to equalize wavelengths to be extracted through multiple scattering. When thickness of PDLC is increased without changing a composition of the PDLC, optical path length in the PDLC is increased while scattering efficiency per volume is kept constant. Therefore, it is conceivable that multiple scattering occurs within the PDLC, leading to improvement in wavelength dependence of scattering. If PDLC is excessively small in thickness, luminance non-uniformity tends to occur. Therefore, thickness of PDLC is preferably large. However, if PDLC is excessively large in thickness, drive voltage becomes high, and furthermore cost may be increased or luminance may be inconveniently increased in a transparent state. Therefore, thickness of PDLC is preferably 3 μm to 70 μm, both inclusive more preferably 5 μm to 50 μm both inclusive, and still more preferably 7 μm to 20 μm both inclusive.

Hereinafter, examples will be described. The following examples are described merely for illustration, and the invention is not limited to the examples.

Small Glass Cell Production Method

30×40 mm PDLC (small glass cell) was produced in the following way. First, ITO was deposited on a glass substrate by sputtering, and then a polyimide solution was coated on a surface of the ITO by a spin coater, and the coated polyimide was dried at 80° C. for 10 min. Next, the polyimide was fired at 200° C. for 60 min, and then subjected to rubbing with a rubbing cloth so that an alignment film was formed. Beads were sprayed onto the alignment film, and a thermosetting seal was printed on the periphery and then heated at 80° C. for 10 min. After heating, the glass substrate was attached to a separately prepared, ITO glass substrate with an alignment film, and a solution including a liquid crystal, a UV curing monomer, and a polymerization initiator, those being mixed in a predetermined composition, (hereinafter, called monomer-mixed liquid crystal) was injected into a gap between the attached glass substrates. Next, the glass substrates were subjected to exposure using ultraviolet rays, and then an injection port was sealed by UV curing resin so that PDLC was produced. Then, the PDLC was attached to a light guide plate with matching oil in between. In this way, a small glass cell was produced.

Film Cell Production Method

300×250 mm PDLC (film cell) was produced in the following way. First, ITO was deposited on a film substrate (ZEONOR) by sputtering, and then a polyamideimide solution was coated on a surface of the ITO by a bar coater, and the coated polyamideimide was dried at 80° C. for 10 min. Next, the polyamideimide was subjected to rubbing with a rubbing cloth so that an alignment film was formed. Next, a surface of the film substrate with the alignment film was attached to a light guide plate of 5 mm thick by an adhesive, so that an ITO film with the light guide plate was produced. Furthermore, beads were sprayed onto the ITO film with the light guide plate, and then a monomer-mixed liquid crystal was dropped onto the ITO film in the atmosphere. Then, the ITO film with the light guide plate was attached to a separately prepared, ITO film with an alignment film in the atmosphere by a laminator. Finally, the attached films were subjected to exposure using ultraviolet rays. In this way, the film cell was produced.

Evaluation Method of Luminance and Spectrum

An end of the light guide plate of each produced cell was irradiated with light of white LED. A diffuser sheet and a lens sheet were placed on a top of the light guide plate in this order, and luminance and spectra were measured by a luminance meter (SR-UL1 manufactured by TOPCON CORPORATION) while voltage was applied to the cell. Wavelength dependence of scattering was defined as a ratio of a normalized scattering-light spectrum to a normalized guided-light spectrum as described before. A slope k, which indicates a degree of wavelength dependence of scattering, shows a slope obtained by linear approximation using the least squares method.

First, the produced cells are described. In example 1, a cell was produced with a thickness of 7 μm according to the production method of a small glass cell described above, where the monomer-mixed liquid crystal was prepared by mixing such that liquid crystal:monomer was 90:10, a trifunctional-monomer mixing ratio to total monomer was 0 percent by weight, and a ratio of the polymerization initiator was 1 percent by weight of the total monomer. Exposure was performed at room temperature with a peak wavelength of 365 nm and exposure intensity of 5.4 J/cm². In example 2, a cell was produced in the same way as in the example 1 except that a trifunctional-monomer mixing ratio was 20 percent by weight. In examples 3 and 4, cells were produced in the same way as in the example 2 except that cell thicknesses were 9 μm and 13.5 μm, respectively. In example 5, a cell was produced in the same way as in the example 1 except that a film was used as a cell material and cell thicknesses was 7.5 μm. In example 6, a cell was produced in the same way as in the example 5 except that a trifunctional-monomer mixing ratio was 20 percent by weight. In examples 7 and 8, cells were produced in the same way as in the example 6 except that cell thicknesses were 3 μm and 15 μm, respectively. Table 1 shows production conditions, luminance and slopes k of the examples, respectively.

TABLE 1

| | Cell material | Trifunctional-monomer mixing ratio | Thickness (μm) | Luminance (cd/m²) | k |
|---|---|---|---|---|---|
| Example 1 | Small glass | 0 wt % | 7 | 6165 | −0.00059 |
| Example 2 | Small glass | 20 wt % | 7 | 7552 | −0.00046 |
| Example 3 | Small glass | 20 wt % | 9 | 7693 | −0.00013 |
| Example 4 | Small glass | 20 wt % | 13.5 | 8518 | −0.00004 |
| Example 5 | film | 0 wt % | 7.5 | | −0.00096 |
| Example 6 | film | 20 wt % | 7.5 | | −0.000675 |
| Example 7 | film | 20 wt % | 3 | | −0.001486 |
| Example 8 | film | 20 wt % | 15 | | −0.00001 |

Hereinafter, evaluation results of the examples are described.

Examples 1 and 2

Figure 27A:
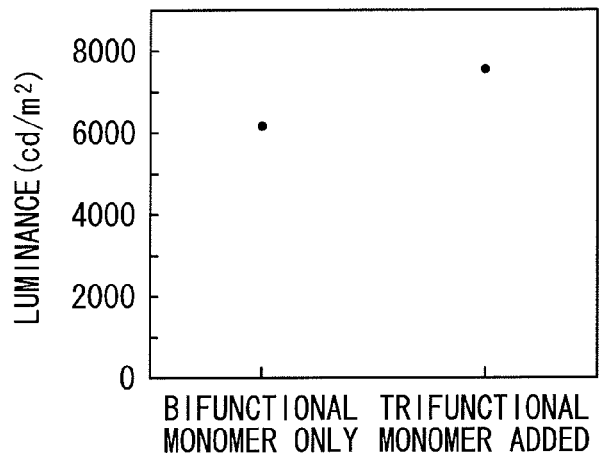
FIGS. 27A and 27B are graphs, where
Figure 27B:
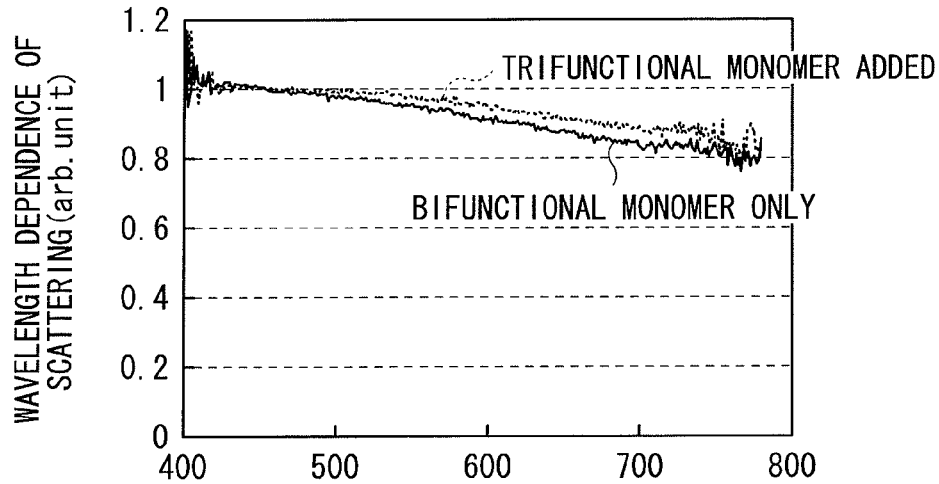

First, a monomer type was adjusted to increase scattering efficiency in order to improve wavelength dependence of scattering. For evaluation, the small glass cell produced by the above-mentioned production method was used, and comparison was made between the example 1, where only a bifunctional monomer was used for the monomer-mixed liquid crystal, and the example 2, where the trifunctional monomer was added by 20 percent by weight of total monomer (FIGS. 27A and 27B). FIG. 27A shows luminance in a white state at a cell thickness of 7 μm and a drive condition of drive voltage of 140 Vpp and applied frequency of 100 Hz. FIG. 27B shows wavelength dependence of scattering in the white state.

FIG. 27A reveals that the trifunctional monomer is added to the bifunctional monomer, thereby luminance is increased to 6165 cd/m² to 7552 cd/m² both inclusive. FIG. 27B reveals that slopes k (nm$^{-1}$) obtained by linear approximation using the least squares method are −0.00059 and −0.00046, respectively, showing that wavelength dependence of scattering is improved by adding the trifunctional monomer to the bifunctional monomer. This is likely to be because scattering efficiency of PDLC is increased due to the trifunctional monomer and thus multiple scattering is increased.

Examples 5 and 6

Figure 28:
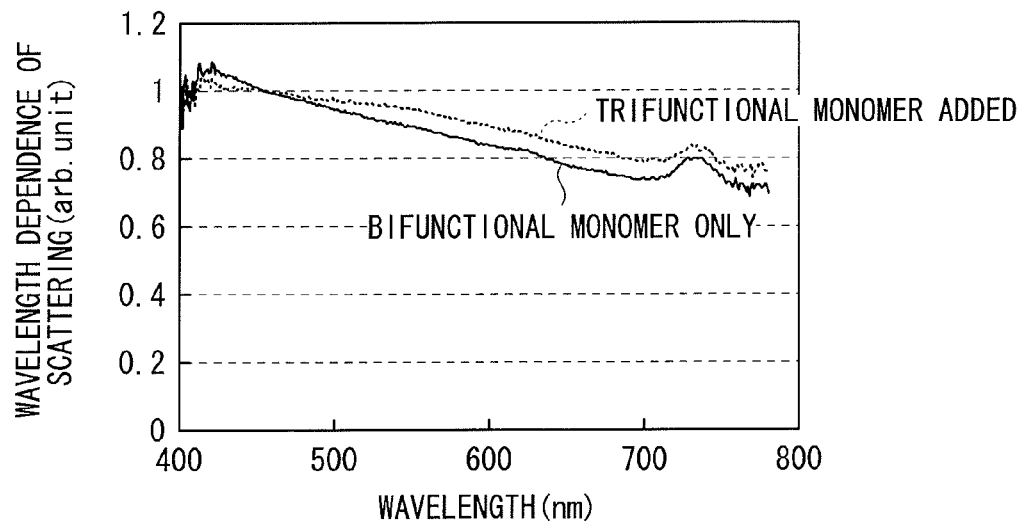
FIG. 28 is a graph showing an example of wavelength dependence of scattering in a white state of a film cell.

FIG. 28 shows an example of film cells. The cells were measured at a cell thickness of 7.5 μm, drive voltage of 140 Vpp and applied frequency of 240 Hz. Even in the film cells, a slope k (nm$^{-1}$) is −0.00096 in a composition including only the bifunctional monomer (example 5), while the slope k is −0.00068 in a composition including the trifunctional monomer added by 20 percent by weight of total monomer (example 6), showing that wavelength dependence of scattering is improved by adding the trifunctional monomer to the bifunctional monomer.

Examples 2, 3 and 4

Figure 29A:
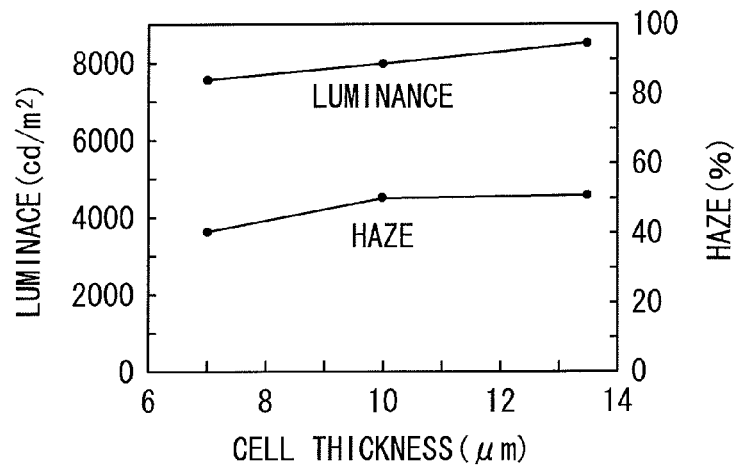
FIGS. 29A and 29B are graphs, where
Figure 29B:
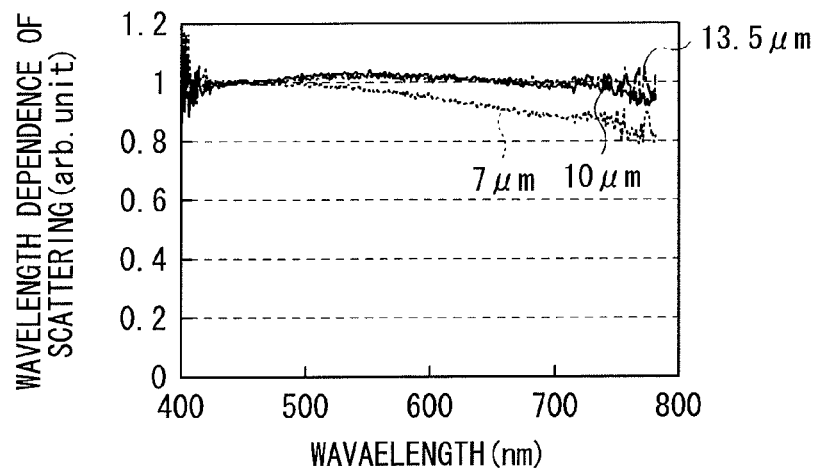

Next, thickness of PDLC was increased to improve wavelength dependence of scattering. Thickness of a small cell was changed to be 7 μm (example 2), 9 μm (example 3), and 13.5 μm (example 4), while a cell composition was not changed, and observation was made on change in luminance, haze and wavelength dependence of scattering in a white state at a drive condition of drive voltage of 140 Vpp and applied frequency of 100 Hz. FIG. 29A shows a relationship between cell thickness and luminance or haze. FIG. 29B shows a relationship between cell thickness and wavelength dependence of scattering.

FIG. 29A reveals that luminance increases with increase in cell thickness: 7552 cd/m², 7963 cd/m² and 8518 cd/m². Moreover, FIG. 29A reveals that haze (scattering) increases with increase in cell thickness. Furthermore, FIG. 29B reveals that the slope k (nm$^{-1}$) approaches 0 (zero) with increase in cell thickness: −0.00046, −0.00013 and −0.00004, showing improvement in wavelength dependence of scattering as well as luminance. This is likely to be because increase in cell thickness causes averaging of wavelengths to be extracted due to multiple scattering.

Examples 6, 7 and 8

Figure 30:
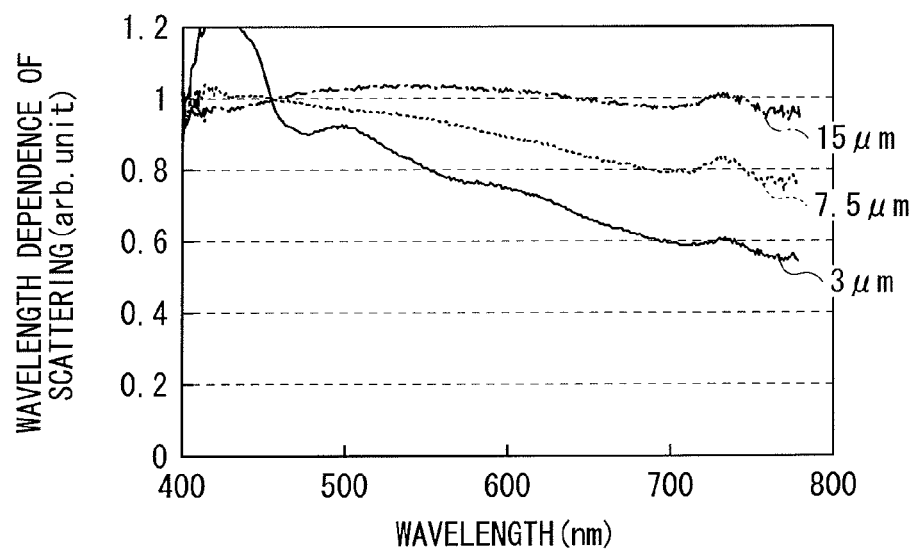
FIG. 30 is a graph showing an example of wavelength dependence of scattering in a white state of a film cell in cell thickness of 3 μm, 7.5 μm and 13.5 μm.
Figure 31:
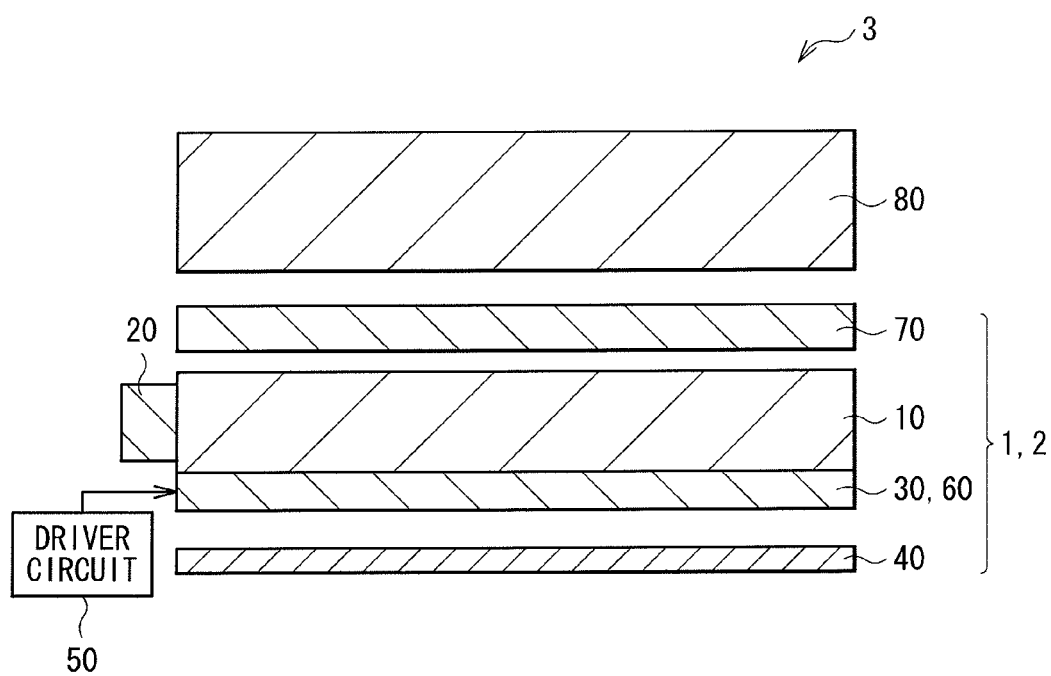
FIG. 31 is a section diagram showing an example of a display device according to an application example.

FIG. 30 shows an example of film cells with cell thicknesses of 3 μm (example 7), 7.5 μm (example 6) and 15 μm (example 8), a drive voltage of 140 Vpp, and applied frequency of 240 Hz. Even in the film cells, a slope k (nm$^{-1}$) decreases with increase in cell thickness: −0.00149, −0.00068 and −0.00001, showing improvement in wavelength dependence of scattering.

To summarize the above, a striped texture is formed through alignment control of a liquid crystal and of a monomer, and furthermore scattering efficiency of PDLC is increased by addition of a trifunctional monomer, or multiple scattering is increased by increasing cell thickness to increase optical path length, so that wavelengths to be extracted may be equalized. The examples 1, 2, 5 and 6, each using the small cell or the film cell, reveal that scattering efficiency is increased by addition of a trifunctional monomer, leading to improvement in wavelength dependence of scattering. The examples 2 to 4 and 6 to 8 reveal that wavelength dependence of scattering is gradually improved by increasing cell thickness.

4. Application Example

Next, an application example of the backlight for 2 of the embodiment is described.

FIG. 31 shows an example of a schematic configuration of a display device 3 according to the application example. The display device 3 includes a liquid crystal display panel 80 (display panel) and the backlight 1 or 2 disposed behind the liquid crystal display panel 80. Either of the backlight 1 of the first embodiment and the backlight 2 of the second embodiment may be used as the backlight mounted in the display device 3.

The liquid crystal display panel 80 displays video images. The liquid crystal display panel 80 is, for example, a transmissive display panel, where pixels are driven according to a video signal, and is structured such that a liquid crystal layer sandwiched by a pair of transparent substrates. Specifically, the liquid crystal display panel 80 has a polarizer, a transparent substrate, pixel electrodes, an alignment film, a liquid crystal layer, an alignment film, a common electrode, a color filter, a transparent substrate, and a polarizer in this order from a side of the backlight 1 or 2.

The transparent substrate includes a substrate transparent to visible light, for example, sheet glass. The transparent substrate on the backlight 1 side or on the backlight 2 side has active driver circuits formed on the substrate, the circuit including TFTs (Thin Film Transistors) electrically connected to the pixel electrodes and wiring lines. The pixel electrodes and the common electrode include, for example, ITO. The pixel electrodes are lattice-arrayed or delta-arrayed on the transparent substrate, and serve as electrodes for each of pixels. On the other hand, the common electrode is formed over the whole area on the color filter, and serves as a common electrode facing the respective pixel electrodes. The alignment film includes a polymer material such as polyimide for alignment treatment of a liquid crystal. The liquid crystal layer, which includes, for example, a liquid crystal of a VA (Vertical Alignment) mode, a TN (Twisted Nematic) mode or a STN (Super Twisted Nematic) mode, has a function of changing a direction of a polarization axis of light emitted from the backlight 1 for each pixel depending on a voltage applied by the driver circuits (not shown). Alignment of the liquid crystal is changed in a multistep manner, thereby a direction of a transmission axis is adjusted in a multistep manner for each of pixels. The color filter includes color filters, arranged in correspondence to a pixel-electrode array, for color separation of light transmitted by the liquid crystal layer into, for example, three primary colors of red (R), green (G) and blue (B) or four colors of R, G, B and white (W). A filter array (pixel array) typically includes a stripe array, a diagonal array, a delta array, and a rectangle array.

Each polarizer is a kind of optical shutter, and transmits only light (polarized light) in a certain oscillation direction. While the polarizer may be an absorption-type polarization element that absorbs light in any oscillation direction other than a transmission axis direction, the polarizer is preferably a reflection-type polarization element, which reflects the light to a side of the backlight 1 or 2, from the viewpoint of increase in luminance. The polarizers are disposed such that respective polarization axes are different by 90 degrees from each other so that light emitted from the backlight 1 or 2 is transmitted or blocked by the liquid crystal layer.

The driver circuit 50 controls magnitude of voltage applied to a pair of electrodes (lower electrode 32 and upper electrode 36) of each light modulation cell 30-1, for example, in such a manner that the optical axis AX2 or AX4 of the fine particle 34B or 64B is parallel to the optical axis AX1 or AX3 of the bulk 34A or 64A in a cell corresponding to a pixel position of black display among a plurality of light modulation cells 30-1, and the optical axis AX2 or AX4 intersects with the optical axis AX1 or AX3 in a cell corresponding to a pixel position of white display among the light modulation cells 30-1.

In the application example, the backlight 1 or 2 of the embodiment is used as a light source for lighting the liquid crystal panel 80. This may increase display luminance while light leakage is reduced or substantially eliminated over a wide view-angle range. As a result, a modulation ratio may be increased in a front direction. Moreover, luminance enhancement may be achieved without increasing input power to the backlight 1 or 2. Moreover, in-plane variation of light intensity distribution of illumination light may be reduced over the whole visible range.

In the application example, the backlight 1 or 2 modulates intensity of light that partially enters into the liquid crystal panel 80 in accordance with a display image. However, if drastic change of brightness occurs at a pattern edge portion of an electrode (lower electrode 32 or upper electrode 36) in the light modulation element 30 or 60, a boundary portion of the electrode may be inconveniently observed even on a display image. Thus, a characteristic, called blur characteristic, is demanded to change brightness as monotonously as possible at the electrode boundary portion. A diffuser plate having high diffusibility is effectively used to enhance the blur characteristic. However, if diffusibility is high, since total transmittance is reduced, brightness tends to be reduced. Therefore, when a diffuser plate is used for the optical sheet 70 in the application example, total transmittance of the diffuser plate is preferably 50% to 85% both inclusive, and more preferably 60% to 80% both inclusive. The blur characteristic is improved with increase in spatial distance between the light guide plate 10 and the diffuser plate in the backlight 1 or 2. Alternatively, the number of patterns of the electrodes (lower electrodes 32 or upper electrodes 36) in the light modulation element 30 or 60 may be increased to adjust voltage of each electrode such that lightness or darkness is changed as monotonously as possible.

The present application contains subject matter related to that disclosed in Japanese Priority Patent Application JP 2010-089075 filed in the Japan Patent Office on Apr. 7, 2010, Japanese Priority Patent Application JP 2010-293311 filed in the Japan Patent Office on Dec. 28, 2010, and Japanese Priority Patent Application JP 2011-048340 filed in the Japan Patent Office on Mar. 4, 2011, the entire content of which is hereby incorporated by references.

It should be understood by those skilled in the art that various modifications, combinations, sub-combinations and alterations may occur depending on design requirements and other factors insofar as they are within the scope of the appended claims or the equivalent thereof.

What is claimed is:

1. A lighting device comprising:
a light guide plate;
a light source disposed on a side face of the light guide plate; and
a light modulation element disposed on a surface or in the inside of the light guide plate and adhered to the light guide plate,
wherein the light modulation element has a pair of transparent substrates disposed separately and oppositely, a pair of electrodes provided on respective surfaces of the pair of transparent substrates, and a light modulation layer provided in a gap between the pair of transparent substrates,
the light modulation layer includes a first region, having optical anisotropy, responsive to an electric field, and a second region, having optical anisotropy, unresponsive to an electric field, and
the second region has a striped structure with average striped texture size of 0.05 µm to 10 µm both inclusive in a short axis direction.

2. The lighting device according to claim 1,
wherein the average striped texture size is 0.2 µm to 7 µm both inclusive in a short axis direction of the second region.

3. The lighting device according to claim 1,
wherein the first region mainly includes a liquid crystal material, and
the second region mainly includes a polymer material.

4. The lighting device according to claim 3,
wherein the light modulation layer has a horizontal alignment film or a vertical alignment film between each of the electrodes and the light modulation layer, and
the second region is formed by polymerizing a polymerizable material, aligned by an effect of the horizontal alignment film or the vertical alignment film, by one or both of heat and light.

5. A display device comprising:
a display panel having a plurality of pixels arranged in a matrix, the pixels being driven based on an image signal; and
a lighting device lighting the display panel,
wherein the lighting device includes a light guide plate, a light source disposed on a side face of the light guide plate, and a light modulation element, disposed on a surface or in the inside of the light guide plate and adhered to the light guide plate, in order from a side of the display panel,
the light modulation element has a pair of transparent substrates disposed separately and oppositely, a pair of electrodes provided on respective surfaces of the pair of transparent substrates, and a light modulation layer provided in a gap between the pair of transparent substrates,
the light modulation layer includes a first region, having optical anisotropy, responsive to an electric field, and a second region, having optical anisotropy, unresponsive to an electric field, and
the second region has a striped structure with average striped texture size of 0.05 µm to 10 µm in a short axis direction.

6. A lighting device comprising:
a light guide plate;
a light source disposed on a side face of the light guide plate; and
a light modulation element disposed on a surface or in the inside of the light guide plate and adhered to the light guide plate,
wherein the light modulation element has a pair of transparent substrates disposed separately and oppositely, a pair of electrodes provided on respective surfaces of the pair of transparent substrates, and a light modulation layer provided in a gap between the pair of transparent substrates,
the light modulation layer includes a first region, having optical anisotropy, responsive to an electric field, and a second region, having optical anisotropy, unresponsive to an electric field,
one or both of the pair of electrodes includes a transparent conductive film, and
the transparent conductive film includes indium tin oxide (ITO), and has an optical characteristic as expressed by the following formula, $$|A1-A2| \leq 0.5,$$

where A1 is maximum light absorptance in a wavelength of 450 nm to 650 nm (%) both inclusive, and
A2 is minimum light absorptance in a wavelength of 450 nm to 650 nm (%) both inclusive.

7. The lighting device according to claim 6,
wherein the transparent substrate having the transparent conductive film provided thereon or both of the pair of electrodes includes a resin substrate, and
the transparent conductive film is crystallized by annealing a film including ITO at a temperature lower than the glass transition temperature of the resin substrate.

8. The lighting device according to claim 7,
wherein the transparent conductive film has a peak at a point in an X-ray diffraction (XRD) chart obtained by XRD measurement, while no peak is measured at the point in a film including ITO before crystallization.

9. The lighting device according to claim 8,
wherein the transparent conductive film has a peak of a (222) plane with half-value width of 0.03° to 2° both inclusive in the XRD chart.

10. The lighting device according to claim 9,
wherein the transparent conductive film has a peak of a (222) plane with half-value width of 0.1° to 0.7° both inclusive in the XRD chart.

11. A display device comprising:
a display panel having a plurality of pixels arranged in a matrix, the pixels being driven based on an image signal; and a lighting device lighting the display panel, wherein the lighting device includes a light guide plate, a light source disposed on a side face of the light guide plate, and a light modulation element disposed on a surface or in the inside of the light guide plate and adhered to the light guide plate, in order from a side of the display panel, the light modulation element has a pair of transparent substrates disposed separately and oppositely, a pair of electrodes provided on respective surfaces of the pair of transparent substrates, and a light modulation layer provided in a gap between the pair of transparent substrates, the light modulation layer includes a first region, having optical anisotropy, responsive to an electric field, and a second region, having optical anisotropy, unresponsive to an electric field, and one or both of the pair of electrodes includes a transparent conductive film, and the transparent conductive film includes indium tin oxide (ITO), and has an optical characteristic as expressed by the following formula, $|A1-A2| \leq 0.5$, where A1 is maximum light absorptance in a wavelength of 450 nm to 650 nm (%) both inclusive, and A2 is minimum light absorptance in a wavelength of 450 nm to 650 nm (%) both inclusive.

\* \* \* \* \*